(12) United States Patent
Collier

(10) Patent No.: US 12,312,700 B1
(45) Date of Patent: *May 27, 2025

(54) WET-BASED CATALYTIC SYSTEM FOR CO2 CAPTURE, SEQUESTRATION, AND TRANSPORTATION

(71) Applicant: Terence Collier, Rowlett, TX (US)

(72) Inventor: Terence Collier, Rowlett, TX (US)

( * ) Notice: Subject to any disclaimer, the term of this patent is extended or adjusted under 35 U.S.C. 154(b) by 420 days.

This patent is subject to a terminal disclaimer.

(21) Appl. No.: 17/903,631

(22) Filed: Sep. 6, 2022

Related U.S. Application Data

(63) Continuation-in-part of application No. 17/882,143, filed on Aug. 5, 2022, and a continuation-in-part of application No. 17/123,416, filed on Dec. 16, 2020, now Pat. No. 11,466,374, which is a continuation-in-part of application No. 16/276,982, filed on Feb. 15, 2019, now Pat. No. 11,359,296.

(60) Provisional application No. 63/324,819, filed on Mar. 29, 2022, provisional application No. 63/301,287, filed on Jan. 20, 2022, provisional application No. 62/974,729, filed on Dec. 18, 2019, provisional application No. 62/695,230, filed on Jul. 9, 2018, provisional application No. 62/695,289, filed on Jul. 9, 2018.

(51) Int. Cl.
| C25B 9/00 | (2021.01) |
| B01D 53/32 | (2006.01) |
| C25B 1/04 | (2021.01) |
| C25B 1/23 | (2021.01) |
| C25B 3/03 | (2021.01) |
| C25B 3/26 | (2021.01) |
| C25B 9/17 | (2021.01) |
| C25B 11/02 | (2021.01) |
| H01M 8/0656 | (2016.01) |

(52) U.S. Cl.
CPC .............. *C25B 9/17* (2021.01); *B01D 53/326* (2013.01); *C25B 1/04* (2013.01); *C25B 1/23* (2021.01); *C25B 3/03* (2021.01); *C25B 3/26* (2021.01); *C25B 11/02* (2013.01); *H01M 8/0656* (2013.01); *B01D 2255/806* (2013.01); *B01D 2257/504* (2013.01)

(58) Field of Classification Search
CPC .... C25B 9/17; C25B 1/23; C25B 3/03; C25B 3/26; C25B 1/04; C25B 11/02
See application file for complete search history.

(56) References Cited

U.S. PATENT DOCUMENTS

| 2014/0332401 A1 | 11/2014 | Gilliam et al. |
| 2017/0073825 A1 | 3/2017 | Sugano et al. |

*Primary Examiner* — Zulmariam Mendez
(74) *Attorney, Agent, or Firm* — Michael Diaz

(57) ABSTRACT

A catalytic system for $CO_2$ capture and sequestration. The system includes a reduction cell for separating a liquid or vapor carrier medium having an anode generating oxygen, a $CO_2$ cathode, and a CO precursor generating hydrogen, oxides of carbon or a hydrocarbon precursor from the carrier medium. In addition, the system includes a power supply for providing electrical power to the anode and the cathode. An electrolysis process occurs where oxygen, hydrogen, and the hydrocarbon precursors are produced. The anode and the cathode include a plurality of geometrical constructs to increase an active surface area of a catalytic surface of the anode and cathode to increase an efficiency of the electrolysis process.

28 Claims, 31 Drawing Sheets

WET-BASED CATALYTIC SYSTEM FOR CO2 CAPTURE, SEQUESTRATION, AND TRANSPORTATION

RELATED APPLICATIONS

This utility application is a continuation-in-part application of co-pending U.S. patent application Ser. No. 17/882,143 filed Aug. 5, 2022, which is a continuation-in-part application of co-pending U.S. patent application Ser. No. 17/123,416 filed Dec. 16, 2020 which is a continuation-in-part application of U.S. Pat. No. 11,359,296 filed Feb. 15, 2019 which claims the benefit of U.S. Provisional Patent Application Ser. No. 62/695,230 filed Jul. 9, 2018 by Terence Collier and U.S. Provisional Patent Application Ser. No. 62/695,289 filed Jul. 9, 2018 by Terence Collier and U.S. Provisional Patent Application Ser. No. 62/974,729 filed Dec. 18, 2019 by Terence Collier all of which are hereby incorporated by reference. In addition, this utility application claims the benefit of U.S. Provisional Patent Application Ser. No. 63/301,287 filed Jan. 20, 2022, and U.S. Provisional Patent Application Ser. No. 63/324,819 filed Mar. 29, 2022, by Terence Collier, both of which are hereby incorporated by reference.

BACKGROUND OF THE INVENTION

Field of the Invention

The invention relates to a catalytic system. Specifically, and not by way of limitation, the present invention relates to a wet-based catalytic system for carbon dioxide ($CO_2$) capture, sequestration, and transformation.

Description of the Related Art

The constantly increasing $CO_2$ levels have been correlated to increasing global temperatures, rising sea levels, local environmental and ecological concerns at a cost that could approach trillions of dollars to mitigate the impact of increasing $CO_2$ levels. U.S. Pat. No. 11,359,296 and U.S. patent application Ser. No. 17/123,416 provide solutions to capture and reduce $CO_2$ levels both in terms of the environment as well as the global economy.

To provide the capture of $CO_2$, it would be advantageous to have a catalytic system comprising and aqueous solute to remove and transform $CO_2$ efficiently, minimizing the need for external forces (electricity and pumping) due to inherent chemical, photoelectrochemical, thermoelectric, as well as capillary forces of the catalytic material and substrate geometrical features. It is also advantageous to utilize a glass substrate, as the glass substrate is also efficient in that such photo processes are improved with a transparent glass substrate (interposer) versus opaque and solid metal traditional cathodes; glass also makes a neutral platform that will not create electrical shorts. The plates could be glass, silicon, ceramics, polymer, or other materials but glass adds both the transparent and inertness far superior to other materials.

The electrochemical reduction of carbon dioxide, also known as electrolysis of carbon dioxide, is the conversion of $CO_2$ to more reduced chemical species using electrical energy. It is one possible step in the broad scheme of carbon capture and utilization requiring efficient catalyst to prove economically viable and sustainable. Traditional electrodes are monstrosities of precious or stainless metal weighing thousands of pounds with electrolysis baths the size of Olympic pools. Improvements may utilize smaller cathodes coated with nanoparticles, but nano solutions are both expensive and unreliable subject to corrosion. To facilitate better control, semiconductor processing may be utilized in the manufacturing process to add reactive nano-like structures to electrodes, specifically the cathodes to transform $CO_2$. Glass (transparent) solutions help improve the photo reaction parts of the process by not blocking light. Such plates can be used to remove $CO_2$ from ocean, terrestrial, atmospheric water sources; non-terrestrial, such as lunar and Martian rocks could also be carbonate sources. It is an object to utilize such manufacturing processes and systems in the present invention.

SUMMARY OF THE INVENTION

In one aspect, the present invention is directed to a catalytic system for $CO_2$ capture, sequestration, and transformation. The system includes a reduction cell, a liquid or vapor carrier medium and electrodes having both an anode generating oxygen, and a cathode to transform $CO_2$ into CO and other precursors, including hydrogen, and other longer chain hydrocarbon and hydrocarbon and oxides of carbon precursors from the carrier medium. In addition, the system includes power, supplied by either internal or external resources, green or otherwise, for providing electrical power to the anode and the cathode. Such a modified electrolysis, a carbonic acid construct, process occurs where oxygen, hydrogen, oxides of carbon or the hydrocarbon precursors are produced. The anode and the cathode include a plurality of geometrical constructs to increase an active surface area of a catalytic surface of the anode and cathode to increase an efficiency of the electrolysis process using semiconductor processing solutions to fabricate small, hyperactive, catalytic structures. Such structures may be used to improve both the forward and reverse reactions for a fuel cell.

BRIEF DESCRIPTION OF THE DRAWINGS

FIG. 27 illustrates a fully fabricated 3D cathode.

DESCRIPTION OF THE INVENTION

Figure 1:
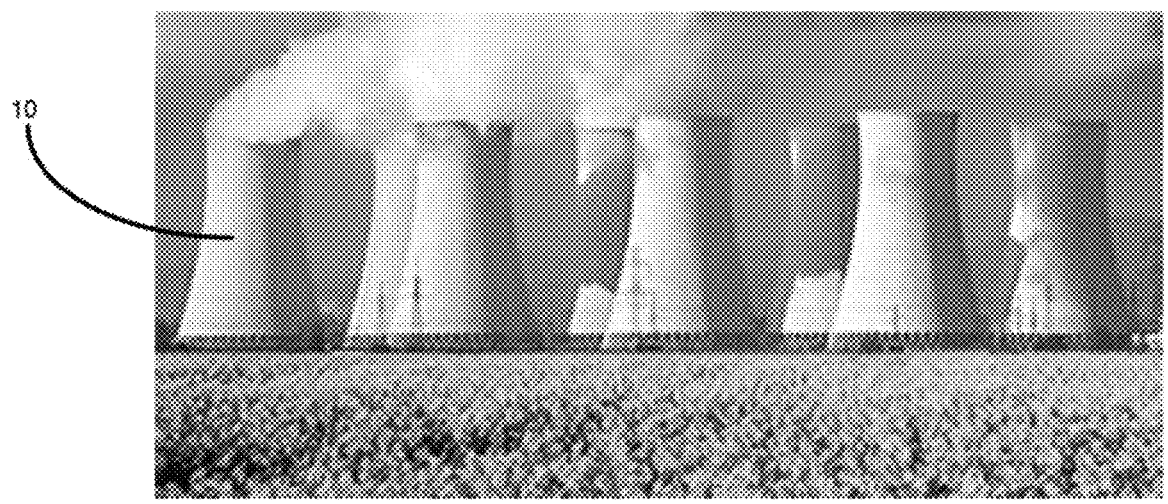
FIG. 1 is a front view of an exemplary cooling tower utilizing where water misting systems are used to capture $CO_2$ in one embodiment of the present invention.

The present invention is a wet-based catalytic system for carbon dioxide (CO2) capture, sequestration and transformation using high surface area electrodes with emphasis on the cathode plates. There are two types of applications which may be utilized, direct air capture as well as wet solutions. The present invention utilizes wet solutions. Competitive $CO_2$ capture systems may use gels, amines, and even water to capture and hold $CO_2$. Some systems require subsequent reprocessing of the absorbents to release the $CO_2$ forming carbonates and other materials that are typically discarded instead of repurposed, cost effective cathodes (CEC) cathodes. CEC cathodes, interposers (substrates) support the transformation of $CO_2$ into useful materials instead of treating $CO_2$ as a wasteful material to be discarded; our interposer supports transformation, a "transposer". An analogy. In the past gasoline was disposed as an annoying byproduct during the production of kerosene. Prior to CEC, $CO_2$ was treated as gasoline in the past, an unwelcome by-product to dispose. In the present invention, this direct air capture solution turns $CO_2$ into planet saving useful products. Instead of using sorbents to capture and transform $CO_2$, CEC plates use an active catalytic and material movement approach to transformational $CO_2$ solutions. As anyone that has been in an elevator or tall building realizes, these structures generate natural air movement (wind/convection) the higher you go. This natural convection occurs due to changes in atmospheric pressure, temperature and outside winds that combine to provide strong air movement in a given space. This air movement can be calculated using various equations and design tools. Useful application of this movement of air is demonstrated in towers used for cooling and exhausting smoke from a point of source to higher elevations, typically from ground to hundreds of feet. In this explanation, towers and building or other structures can be assumed to be the same or a similar application. This movement of air supports a direct air capture approach where stand-alone $CO_2$ or a $CO_2$ laden carrier is passed over or through catalytic plates to transform $CO_2$ or other gases into other products. In some cases, electrical potential is required but in others an improved catalyst alone, with or without solid state energy, might singularty become a transformative solution, eliminating the need for an external electrical bias. It is also possible that $CO_2$ may be repurposed in a carrier free solution eliminating the need for aqueous solute/solvent. Dissociation of $CO_2$ with high potential three dimensional (3D) cathodes may also be utilized.

Tower and tall structures improves efficiency in that air movement is supplied naturally without consuming capital resources (electrical power, materials, and equipment) to install fans or blowers to facilitate air movement. The vias in the through glass via (TGV) coated cathode solutions also provides additional material movement due to the high capillary effects of the vias. Similar to the methods used to scrub exhaust air, $CO_2$ density in a carbonic acid system in these towers can be increased by using spray misting systems to incorporate in a liquid water matrix. $CO_2$ in air, water vapor is not as high, but will work as well. In the present invention, the catalytic plates provide a better solution as the improved efficiency support smaller and more electrically efficient solutions compared to traditional cathode plate solutions. As a result, the water carrier density requirements might not need be as high. In other embodiments, any material other than glass may also be used as an interposer. Thus, all reference to TGVs may be through vias constructed of other materials in alternate embodiments of the present invention.

In the present invention, the wet-based solution focuses on carbonic acid electrolysis. With the water-based solution, water to $CO_2$ ratios are much higher with liquid water, compared to vapor, and is the primary carrier for $CO_2$. Where $CO_2$ is dissolved in water, the solute, such as a carbonic acid solution is the basis for most electrolysis-like solutions. This solution is more in line with the traditional electrolysis process where cathode and anode pairs generate the targeted materials. The goal in the direct air approach is to minimize water usage and possibly eliminate it, except as when needed to form other hydrocarbon, carbon oxides and exotic materials. The water-based solution is applicable to capture systems in cooling towers, terrestrial aquatic sources, atmospheric $CO_2$ in rain, and finally exhaust waste systems of various sorts. A hybrid wet and dry solution can theoretically support a recirculating and reclamation system where $CO_2$ is converted to a reconstituted fuel improving process efficiency. Such a solution would also support running a vehicle on water and a $CO_2$ tank where $CO_2$ is bubbled into the water and green energy supports efficient hydrocarbon and carbon monoxide (CO) generation for fuel. In a steam hydrogen process where methane is reacted with water at high temperature, hydrogen is produced with large amounts of $CO_2$. That $CO_2$ could be reconstituted to other transformed materials with the proper cathode system. Such plates, with high capillary forces, may also be used to remove $CO_2$ from the ocean, terrestrial and atmospheric water sources, using the improved catalytic and ultra-high capillary forces. On the other hand, for direct air capture applications, towers may be placed in high population density locations or in remote locations. Either solution supports the decentralized distribution of biofuels, CO, and hydrocarbons from the conversion of $CO_2$.

In the present invention, a CEC plate is utilized. The electrochemical reduction of carbon dioxide, also known as electrolysis of carbon dioxide, is the conversion of carbon dioxide ($CO_2$) to more reduced chemical species using electrical energy. Enhanced control is realized using semiconductor processing to add reactive nano-like structures to cathodes. For example, pillars are grown after seed metals are deposited. This can be accomplished by seed and plate or by depositing structures using liftoff like solution. In another technique, vias can also be fabricated by various wet or dry etch solution, even by laser drill. The vias can then be coated using various deposition techniques such as electrolytic and electroless plating, atomic layer deposition (ALD), chemical vapor deposition %—CVD), ebeam, sputtering, and other deposition techniques. Such solutions add benefit in that various solid state solutions can be used to make semiconducting, thermoelectric (Seebeck, photovoltaic etc.), and galvanic/voltaic/galvanic solutions for in-situ power generation. Glass (transparent) solutions help improve the photo reaction parts of the process by not blocking light. Such plates may be used to remove $CO_2$ from ocean, terrestrial and atmospheric water sources. A 3D cathode provides several advantages. First, by utilizing 3D cathode plates, better control in feature size is obtained. Feature size control is maintained when the catalyst is applied in a controlled manner. Semiconductor features can be fabricated with the utmost control down to the nanometer. In other fabrication solution, the catalyst might be fabricated first, then applied to a catalytic plate. This requires more fabrication steps but most of all feature size statistical distribution varies greatly. By fabricating structures directly on the catalytic plates, variation across trillions of features is within less than tenths of microns to support greatly improved catalytic structures and catalytic functionality from cathode to cathode just as the efficiency of each die on a wafer and from wafer to wafer is greatly maintained.

Another advantage is improved feature density. Most other catalytic solutions require fabrication of the catalyst, then placement of the catalyst on the cathode. For example, nanoparticles are fabricated as a stand-alone material. These nanoparticles are applied to a cathode, typically by spray or gluing, losing the individual activity of a given particle. The "spray paint" coating provides no individual control. With feature fabrication by the ultimate control semiconductor fabrication growth practices afford, each particle maintains a distinct identity; such processes also allow fabrication of complex alloys which have shown to have improved catalytic properties. As a result, the overall density of the particles improves. A spray solution has exposed 3D features that are not controlled. In the present invention, individual feature geometry (size, shape, and position) may be controlled to increase both surface area and density per given area.

Another advantage is higher surface areas are utilized. Semiconductor fabrication allows the increase in aspect ratios thus more surface area. Since area is a cube function, simply changing 1×1×1 um structure to 2×2×2 um increases the area by 8 times. It's not uncommon to go from 1:1 features to 50:1 and 80:1 increasing the area by orders of magnitude while still maintaining discreet individuality. Both surface (pillars for example) and subsurface (vias) benefit from such fabrication solutions. With process control, both surface and subsurface features may be grown. Fabricating features with very high aspect ratio dramatically increases surface area in many cases with similar cycle time and minimal additional cost. It is not uncommon to fabricate over 100:1 aspect ratios with small geometrical constructs in a wide selection of metals or features that have been fabricated then coated. The through via functions also support strong capillary forces eliminating the need for pumping solutions.

Still another advantage is the assembly process is cheaper. Some of the exotic catalytic solutions can be more expensive than platinum plate electrodes. Fabrication of the material, a carrier material, separate cathode, application, and material lost at spray can be quite expensive. Some nanoparticle solutions might cost more per gram than gold. Taking advantage of semiconductor solutions, high efficiency cathodes can be fabricated at a fraction of the cost with multiple catalysts applied during cathode fabrication to take advantage of preferential optimization of reaction chemistry. Such solution take advantage of the capacity to fabricate multiple units in single runs using less expensive active metal catalytic constructs.

The present invention uses a well understood fabrication process. Nanoparticle and other exotic materials require complex and intricate fabrication solutions. Most current processes are new to the market and do not have high volume production adding to the higher costs. Semiconductor fabrication is well understood with millions of wafers produced each year. Fabrication of high density geometrical constructs are the norm in IC fabrication with tools, engineers and factories readily producing material each day. Adapting such a solution to support $CO_2$ transformation is much simpler than developing exotic materials and processes.

In the present invention, a much wider selection of materials may be utilized. Nanoparticle and $CO_2$ absorption solutions are only offered in a few materials. Even when new materials do come on-line, techniques for fabrication, high volume production and distribution will be required. IC fabrication supports a diversity of metals, metal-like solutions, metal oxide and other solutions that are easily produced. Multiple materials can be co-deposited for binary, tertiary, and additional solutions of exotic solutions. In the feature sizes capable in IC fabrication, many of these solutions become extremely active compared to their macroscopic counterparts. For example, tin and copper are used in high volumes in IC fabrication for device packaging. Whereas bulk copper and tin are not necessarily great catalytic sources for $CO_2$ transformation, at micron and submicron scale they become quite active. Even iron, nickel, silver, titanium, etc. becomes a great catalyst for $CO_2$ transformation.

The present invention provides selective and controlled electrical distribution and selectivity per site. Nanoparticles application involve spraying or gluing the material on a bulk cathode. The entire plate is then activated with electrical bias to form one cathode unit. Individual particles are no longer as active as the original nano-solution. In the present invention utilizing semiconductor fabrication solution, electrical bias may be routed to individual structures, groups of structures, or a solid plane/layer. Such control means each structure sees the same electrical potential. Such fabrication solutions also support direct interaction of contactor to take advantage of the electrochemical and solid state physics. Seebeck, photovoltaic, galvanic, etc. are all means of generating electrical potential. This is helpful as changing the potential changes the output gas. Even though a given voltage might be applied at the point of contract, across the wafer that number can change resulting in a great distribution of current/voltage density. As simple as changing the conductor path (wiring), each feature can be controlled. Other techniques such as daisy chains, parallel connectivity and changing metal conductor can improve control. Electrochemical reduction of carbon dioxide producing chemicals or fuels, converting carbon dioxide ($CO_2$) to organic feedstocks such as formic acid (HCOOH), carbon monoxide (CO), methane (CH4), ethylene (C2H4) and ethanol (C2H5OH) are possible with the correct catalytic plates. Among the more selective metallic catalysts in this field are tin for formic acid, silver for carbon monoxide and copper for methane, ethylene, or ethanol. Methanol, propanol, and 1-butanol have also been produced via $CO_2$ electrochemical reduction, albeit in small quantities. Examples of electrochemical reduction of carbon dioxide reduced to carbon monoxide using a zinc cathode demonstrate the broad possibilities.

The present invention also provides for selective transformation of gases by controlled selectivity of individual catalytic structures. As discussed above, changing the bias on a structure results in a different output material or even no material. Control on electrical bias helps selectivity and purity of output materials. Metals such as palladium also support controlled filtering of H2. Depending on the metal, a more efficient process may be designed. For example, whereas traditional electrolysis uses platinum for both cathode and anode for all gas production, metals may be selected that can be targeted towards optimum gas generation and system electrical efficiency.

U.S. Pat. No. 11,359,296 and U.S. patent application Ser. No. 17/123,416 describes the manufacture, design, and constructs of 3D electrode embodiments. The present invention provides different applications of these cathodes and anodes with 3D structures using such features as pillars, balls and/or vias. These features allow for the conversion of $CO_2$ into multiple materials, such as CO, ethanol, formic acid, green hydrogen, precursor, etc. These materials can also be recombined in a Fischer-Tropsch (FT) process to generate longer chain carbon based materials such as kerosene, gasoline, jet fuel, up to and including plastics; even electricity and energy are possible. Details and suggested applications are described below. Such 3D electrode systems can also replace catalytic converter embodiments converting $NO_x$ and $SO_x$ similar to current palladium coated converters.

Catalytic cathode conversion solutions for multiple applications may be generally grouped into two areas where process moisture level is the key instrumental factor. Systems that are water intense, such that a liquid water like electrolysis setup using carbonic acid is one path and the other where lower levels of water such as a vapor, misting, steam and even the ambient water levels in air is the counter approach; it is possible that a direct air delivery with near zero to no water is possible even using a different carrier medium instead of an aqueous approach.

In the present invention, a moisture intensive capture system is utilized. Existing moisture intensive capture systems utilize a process similar to liquid water electrolysis setups. $CO_2$ is dissolved or captured in liquid water system to make carbonic acid. A cathode and anode pair can be used to generate select materials at either electrode with the cathode a primary target in $CO_2$ repurposing. Industrial sprays systems, existing bodies of water or incorporation bubbling $CO_2$ solutions are natural and man-made sources of carbonic acid. Separation mechanisms for $O_2$, $H_2$, and hydrocarbons are determined at the electrode potentials for various uses and applications. Hyperactive catalyst, with or without solid state energy harvesting, might also eliminate the need for electrical bias and/or aqueous carriers in some applications. In other embodiments, a carrier other than water might also be utilized.

In higher water load $CO_2$ systems, examples of $CO_2$ conversion to useful materials with the correct catalyst provide a baseline approach. In one embodiment, fabrication of an underwater breathing apparatus that runs on a battery, or solid state power, where ocean water containing dissolved $CO_2$ may generate $O_2$ and $H_2$. The $O_2$ can be consumed for breathing and the $H_2$ can be channeled for fuel cell or battery power with hydrocarbons. In another embodiment, the reduction and removal of $CO_2$ from oceans to reestablish and balance pH to safe levels while providing valued resources such as hydrocarbons, $H_2$ and bio precursors may be achieved. Generating useful materials from water sources, fresh and salt, with reductions in power and infrastructure is an economically desirable route. In still another embodiment of the present invention, the filtration of materials, such as blood, with the appropriate via sizes and in some cases, coatings, to kill or catalyze materials may be achieved. Copper and silver are good examples of such medical solutions. In another embodiment, reactive in-line and recirculating processes are utilized for possibly building a $CO_2$ engine.

In one medical embodiment, controlled vias sizes support filtering of blood in applications such as dialysis or other medical applications. The vias may also be coated with metals such as silver and copper that have antimicrobial properties to kill pathogens that pass through the filters. The filters can also block pathogen cells that might be larger than normal cells from passing through a via array or over pillar constructs. A thin 3D metal film has also been constructed using techniques to initially hold the film during processing with or with the film in the final application. In another embodiment for PEM/AEM batteries, an electrolyte with controlled membrane separating electron/proton transport to use thin glass membrane, plugged or unplugged vias, is utilized as a battery. Existing solutions are polymer electrolyte membranes (PEM), using gels, that are not as durable or can carry the duty, density or life that is needed for next generation solutions. A membrane of processed glass or a mesh polymer membranes will have a much higher density approach. Electric Vehicles (EVs) and other membrane requirements can be exceeded including $CO_2$ systems used in NASA missions. Currently, for ocean revitalization, carbonates are converted to process materials for $CO_2$ generation in an ineffective cost effective approach. Carbonates can be inexpensively found for less that $20 per ton. In the present invention, ocean water is converted to hydrocarbons and blue hydrogen. Select durable metals, such as titanium, can be used as cathodes in aggressive ocean systems. Large plate metal cathodes are not cost effective options with existing approaches. The present invention may also be used in providing decentralized energy. Working with $CO_2$ spritzer systems to supply fuel to homes, business and communities that have access to water can supply their own fuel. $CO_2$ can also be stored from a DAC system to make carbonic acid and a home energy solution.

In still another embodiment, the present invention may be a $CO_2$ engine. It is possible to make carbonate so an engine can be made to run on hard fresh water or ocean water. By bubbling $CO_2$ into water, carbonic acid can be produced. If a power source is supplied, $CO_2$ may be split into fuel. Burning the $CO_2$ in an engine can produce heat that then can be used to generate electricity from a solid state solution such as Peltier, Seebeck, etc. solutions. Electricity can also be provided from an additional battery or solid state solar cell. Such a system could also replace the catalytic converter to change $CO_2$ into fuel that can be burned. It is also possible that the correct catalyst, such as the existing palladium, can be used to convert $NO_x$ and $SO_x$ to reduce pollution. This may result in reduced auto/truck exhaust where $CO_2$ can be upstream or downstream of exhaust gases to convert to usable materials. A small combustion engine may be used as a converter and even downstream to convert materials beyond $CO_2$.

Direct air capture systems do not necessitate the heavy water load of a baseline electrolysis like carbonic acid process, although both light and an aqueous free system may be employed. A goal in this approach is to have a method and system of reduced water load using pillars or via systems that can repurpose $CO_2$ with reduced water loads. It should also be understood that these 3D structures may also be used to transform other materials such as SOx and NOx into materials simply by adding palladium as a catalyst similar to existing catalytic converters in cars. Such a system may not be limited to high or low material flow, such as a liquid based water intensive electrolysis like solution. The $CO_2$ transport, as needed to capture exhaust $CO_2$, may utilize a vapor system where $CO_2$ is in a gel, water, or water-less carrier (mist, steam, fumes, etc.), that does not require a full electrolytic-like process. The $CO_2$ may just be the $CO_2$ in ambient air with a higher surface area catalyst. Existing $CO_2$ repurposing solutions do still require electrode bias to separate and transform $CO_2$ into various components from the carriers. Passing over pillars or through vias for reactivity, either process is an improvement over films and/or gels that capture and release $CO_2$ or reactive nanoparticle cathodes that are exotic and costly. In the present invention, such a system is also much more flexible in applications where a $CO_2$ dissolved in a liquid water carrier may be more extensive in cost (fabrication, setup, OEM design, weight limitations, etc.). The direct air approach supports installation in existing structures, stand-alone structures, and support of new designs where low-carbon footprint is critical. Exhaust control on smokestack and similar cooling tower approaches, such as inline systems, can capture and repurpose the exhaust into useful material or simply sequester. A pre-filter may be required to grab larger particles such as soot or debris leaving $CO_2$ reactive materials for the cathodes. In another application, an air scrubber may be attached to a solar or other energy source to continuously convert $CO_2$ into usable materials. In another embodiment, direct air capture and wet solutions support recycled $CO_2$ in a closed loop system for efficient recycling of $CO_2$. Similar to an air scrubber, in another embodiment of the present invention, an in-line 3D cathode embodiment may use the natural vortex/draft where the tall building creates a flow that forces the $CO_2$ through a TGV cathode, although pillars may be utilized, a TGV cathode provides a more effective and efficient solution in area, materials and size.

There are several applications for use of the direct air capture system, possibly hybridized with a wet approach. One such application is utilized with cement production. Cement is the second largest source of expended $CO_2$. Almost an equal amount of $CO_2$ is generated processing calcium carbonate to lime (CaO) to cement. $CO_2$ is also generated in the kiln burners. Here the $CO_2$ ratio to air concentrated more than most applications, so use of the direct air capture system can be more efficient than a backup water heavy solution. The CO2, already captures, could also be then sequestered to support conversion of a carbonic acid bath to produce an alcohol for fuel or other transformed materials, depending on the need. In addition, the hybrid direct air capture (DAC) or DAC/H2O system may be utilized with green and blue hydrogen. Green and blue hydrogen is fabricated by water electrolysis in one approach but also fabricated by reacting methane with water in high temperature environments. This reaction of methane and water to produce hydrogen also generates a large amount of $CO_2$. In a blue hydrogen process, the $CO_2$ is converted to a useful product. 3D catalytic solutions may change that blue process to a bluer process by transforming the $CO_2$ in simple hydrocarbons and CO or using a FT process to make longer chain hydrocarbons. A palladium (Pd) thin film cap may be positioned on top of via to filtered hydrogen. In another application, the direct air capture system may be utilized with steel. Coke is a key material used in the manufacture of steel. Coke is basically pure carbon formed from bituminous coal. Burning coke generates $CO_2$ exhaust gas. In one embodiment, a catalyst plate converts the $CO_2$ to biomaterials, carbon monoxide and hydrocarbons that may be sold, incorporated in a feedback loop, or simply processed to other longer chain carbon solutions. The excess heat from a steel process helps provide the energy for a FT process where heat, H2O and hydrocarbons or CO form longer chain materials. In another application, the present invention may be utilized in coal. Coal is a, critical, readily available low cost energy, and fuel source. Burning of coal, almost pure carbon, results directly in $CO_2$ as carbon with carbon combustion. Many applications have sought cleaner alternatives to coal usage. In this application, the dirtier particulate matter of coal consumption is eliminated, and the high concentration of $CO_2$ is then directly burned in a $CO_2$ catalytic system. $CO_2$ is then repurposed into other fuels and solutions using a stand-alone DAC or DAC/H2O or aqueous approach as a result of the higher concentrations of CO2. The present invention may be utilized in space travel. $CO_2$ should be reprocessed efficiently. Current systems capture and then release $CO_2$ in gels and other materials to prevent $CO_2$ buildup in breathable atmosphere in space vehicles. For longer term space missions, it might be possible to have plant based solutions to recirculate the air. But a $CO_2$ system could also supply fuel and energy (Seebeck, PV, galvanic, etc.). In particular, the rocks on the moon and other extraterrestrial bodies where structures are to be fabricated might be carbonate materials. Fabrication to cement and structures would generate that same $CO_2$ that could then be used as fuel for rockets, for heating and for hydrocarbon based systems.

The present invention may also be used in energy production. Many aspects of energy production are centralized with distribution nodes adding to $CO_2$. In many areas of the world, people also cannot afford energy that might be produced in their country. Energy production that is decentralized and economical would lead to lower cost, cleaner fuels, and improvements in global $CO_2$ level when forests are not cut and burned, coal is not consumed, and $CO_2$ can be pulled from air and industry for hydrocarbon generation. In one embodiment, with in-house and on-house constant fuel generation, $CO_2$ may be removed using renewable energy, such as solar or small wind turbines and a simple $CO_2$ soda spritzer-like system. Furthermore, a decentralized energy strategy may be implemented by utilizing a $CO_2$ spritzer system embodiment to supply fuel to homes, businesses and communities that have access to water, even atmospheric water, to supply their own fuel. Locations that are on oceans or other larger bodies of water may use a carbonic acid electrolysis system to generate fuel, water and base materials for consumption or sale. In another embodiment, an FT engine may be used to recombine separated material to formulate kerosene, jet fuel and others. The alcohol levels in the aqueous could also be burned once the alcohol concentration is high enough to support combustion, typically greater than 40%. This proof can be acquired by distillation. Additionally, existing $CO_2$ transport pipelines where 3D cathode filling stations may be placed in-line to transform the $CO_2$ into useful biomaterials and/or fuel. The above mentioned applications and embodiments are all possible with a 3D cathode $CO_2$ regenerative system. The coated catalytic through glass and pillar plates make all these embodiments possible.

When a carbonic acid bath is transformed to CO and $H_2$, that material can then be converted to longer chain hydrocarbons in a FT process. Those transformed materials can also be produced using externally supplied power or using solid state solutions. The resulting gases can then be used to form a combustion-based engine. The hydrogen can also be diverted to make a fuel cell or rechargeable battery. By having a fine mesh that is coated, the 3D structures behave as a PEM/GEM mesh where the size of the small vias trap air and prevent fluid transfer; additional anisotropic coatings can be used as well. The metallic coatings support the movement of ions/electrons back and forth for the battery/fuel cell. Breaking those bubble has the opposite effect supporting strong capillary action for material movement. A gel-based electrolyte will not travel past the small vias whereas the electrolyte charge will transverse.

In another application, NASA scientist are suggesting using rocks on these planets to make cement for structures. That same process for cement production yields $CO_2$ which could be transformed to hydrocarbons for fuel or even used in a GEM fuel cell.

FIG. 1 is a front view of a cooling tower 10 utilizing direct air capture in one embodiment of the present invention. The cooling tower 10 supports a natural flow of air without the need of fans or forced flow. Convections in such structures have a natural movement of air that improves the efficiency of a cathode plate, transposer, and process for direct air capture. By inserting 3D cathode plates in this tower, $CO_2$ can transverse through cathode vias for increased catalytic interaction. In such an embodiment, entry is the $CO_2$ source/carrier while the exit is the target repurposed material. A second approach could use misting systems to capture $CO_2$ and convert using pillar or through via transposers. Power can be supplied to plates to provide a completely autonomous fuel solution removing $CO_2$ from air. Such solutions may be implanted across the globe particularly in areas of the world where access is difficult, and the population might not have the financial means to purchase or build energy solutions. Gases and materials can be condensed and sold or used at point of source raw goods.

Utilizing a cooling structure, such as a tower 10 provides for direct air capture and transformation using natural draft cooling within the tower. A cooling tower supports a natural flow of air without the need of fans or forced flow. The height of a tower is directly proportional to the air movement. A larger tower has more air movement as noted in an elevator. A tall building has a much stronger movement of air compared to a building with fewer floors. In the cooling towers 10 of FIG. 1, similar to structures used at a nuclear plant, the air movement is strong enough to eliminate the need for fans even with high density vias that might restrict air flow. Such high air movement rates can also turn the blades of a turbine to generate electricity to provide power to the anode and cathodes of a transformative $CO_2$ capture and repurposing system. By inserting 3D cathode plates in this tower 10, $CO_2$ can transverse these reactive plates. A through via as well as a 3D surface plate transposer provides a catalytic solution. As will be discussed in FIG. 2 below, insertion of through hole catalytic plates allows air, with or without moisture, to pass directly through the plates as a much more effective interaction of contact. Such through via cathodes are unique in that most applications have material passing over a surface to absorb and process. A through passage where material enters as $CO_2$ and exits as a new solution is an improvement. Even if the plates are only 50% effective, the second plate may have removed 75% of the $CO_2$, the third plate 87.5% and so forth. Therefore, a series of plates removes and transforms material to a desirable end-product. In this embodiment, entry is by $CO_2$ and exit is the target biomaterial. By changing the potential of the plates, $CO_2$ entry can be selectively targeted as one of many exit biomaterials including pure blue hydrogen. The plates support adding palladium caps which are natural filters for hydrogen. The plates also support optimizing the target material to the correct catalytic material selection for system efficiency. Gases may also be recombined in a subsequent FT process to produce longer chain hydrocarbons. Power may be supplied to plates or as an integral part of the plate (using solid state solutions) to provide a completely autonomous fuel solution removing $CO_2$ from air. Using electromechanical, thermoelectric, photovoltaic, or galvanic derived green or non-green energy sources serve as the power source for the catalytic plates. Some materials may be active enough where no electro-motive source is required. Such solutions may be implanted across the globe particularly in areas of the world where access is difficult, and the population might not have financial means to purchase or build energy solutions. Towers may be placed in various locations similar to wind turbines to generate fuel while scrubbing the air of $CO_2$. Both water vapor (in air) and spray misting systems can be used to augment $CO_2$ repurposing. Gases may be condensed and sold or used at the point of source. Captured gases may be stored, then later condensed, or liquefied at the point of source. Using a FT process, simple hydrocarbons or CO can also be transformed to longer chain hydrocarbons using 3D cathodes.

Air flow in buildings and structures such as towers is complex, time dependent and multi-directional. The understanding of air flow through and within a structure is based on the requirement for continuity of mass and momentum caused by wind forces, thermal effects (stack action) and forces associated with the operation of mechanical cooling, heating, exhaust, and other ventilation systems. Pressure differential, temperature and design all play a part. Such structures include the following: buildings where the natural draft could be used to capture, transform and repurpose dry or moisture laden air movement in a cost and environmentally efficient manner; towers that have cooling solutions for industrial/manufacturing, power generation and general cooling for homes, factories and high rise structures; direct air capture towers, standalone, for green and blue energy generation of hydrocarbons/CO with $CO_2$ reduction; and ocean stabilization by removing $CO_2$ from ocean water. $CO_2$ dissolved in ocean and terrestrial water sources are sources of carbonic acid reduction with more efficient 3D structured cathodes.

Figure 2:
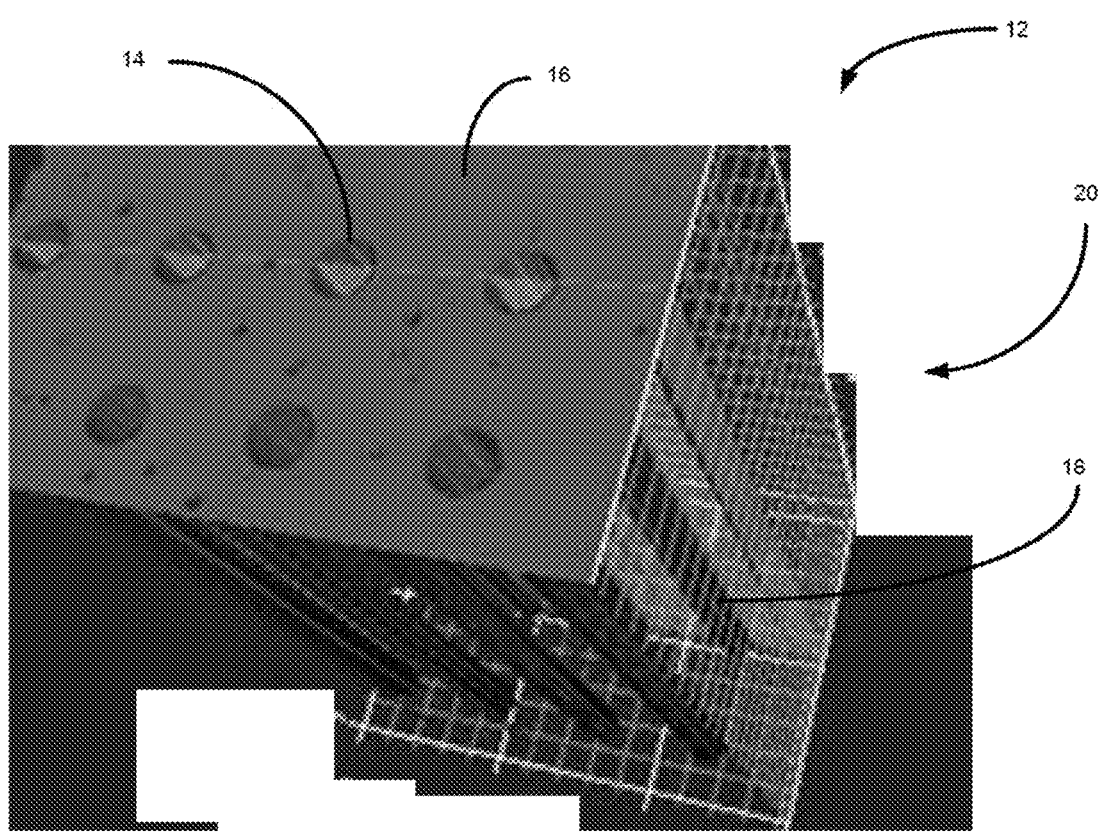
FIG. 2 illustrates a top view of a through via electrode in one embodiment of the present invention.

FIG. 2 illustrates a cross section of a 3D through glass interposer 12. The substrate used with the interposer (or transposer) may be glass, ceramic, silicon, or other suitable materials. Glass provides durability that is not available with other materials. In this case, 25 um diameter through glass vias (TGV) 14 in 500 um glass located on a bulk glass substrate 16 supports a solution that can be subsequently coated with various materials for high surface to material catalytic interactions, selective electrical routing, great photoelectrochemical interaction and a reduced cost, durable structure, which is more reliable chemically, mechanically, and electrically than other solutions. In addition, the present invention may utilize metal coated through vias 18. High aspect vias support catalytic effects that may pull liquids as high as seven feet if needed. Through vias support improved material movement over interfaces compared to surface 3D structures that have been coated with various catalytic materials. In one embodiment, coatings are deposited with a deposition technique such as atomic layer deposition (ALD) as aspect ratio of the vias increase. When such vias are stacked in a housing a complete transformation solution is achieved. As the first cathode might have only 10% efficiency, a stack of plates eventually achieves a higher ratio of transformed material compared to the initial CO2. (NOTED in cooling tower of FIG. 16)

Figure 3:
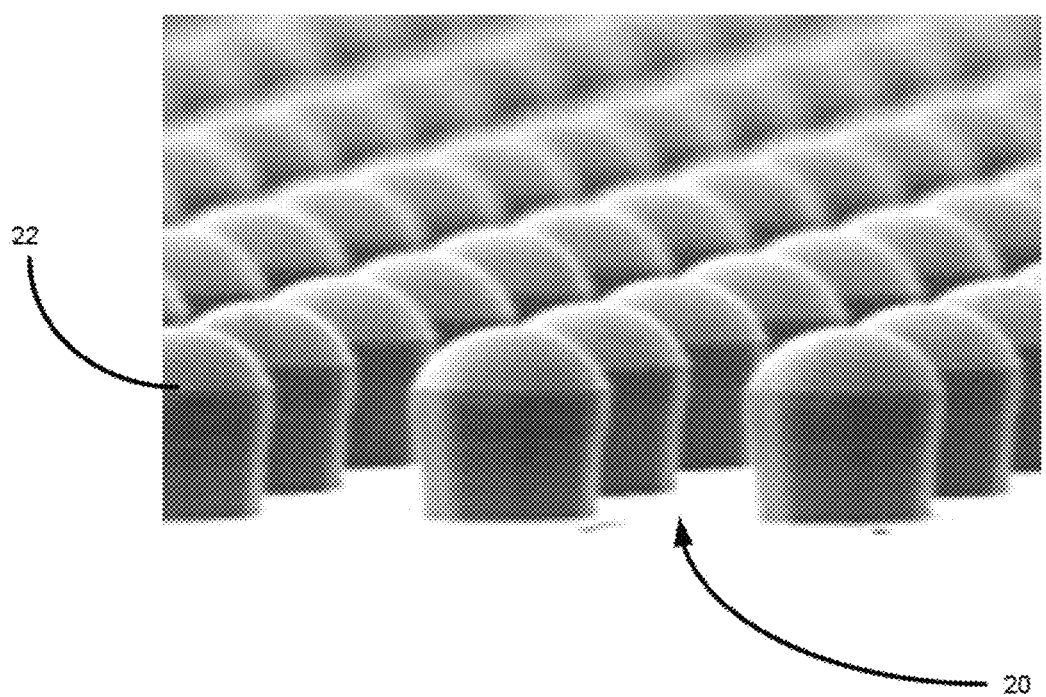
FIG. 3 illustrates a Scanning Electron Microscopy (SEM) image of a surface three dimensional (3D) CEC plate.

FIG. 3 illustrates a Scanning Electron Microscopy (SEM) image of a surface 3D CEC plate 20. The substrate includes high density cylindrical copper micro-structures or pillars 22 capped with tin. The pillars may include copper or any other metal combination bases; such features could also generate solid state energy. Such 3D structures provide an improved solution where multiple catalytic materials may be applied to increase the efficiency compared to single catalyst solutions. 3D structures support direct catalyst electrical routing solutions that are not available with other solutions. Electrical paths can be deposited with great precision to assure each pillar has much more similar electrical potential compared to other plate solutions. In a standard plate solution (non-semiconductor), electrical potential changes across the surface. In a solution where output material has a select electrical range, controlling the electrical potential provides better material output and catalytic site to site control similar to TGV solutions. In a PEM/AEM rechargeable battery, the membrane allows charge transport while maintaining a barrier of the electrolytes. Using glass, with or without fully plugged pores, the material can be segregated with the charge being able to transverse using the metal conductors. Adding a palladium cap allows transport of H2 only as Pd is a natural H2 filter, improving the system both in process efficiency and the durability of glass (or other substrates) that are much more durable than existing polymer solutions. The higher density, small controlled vias, also show how much better the current density transport will improve compared to existing solutions.

Figure 4:
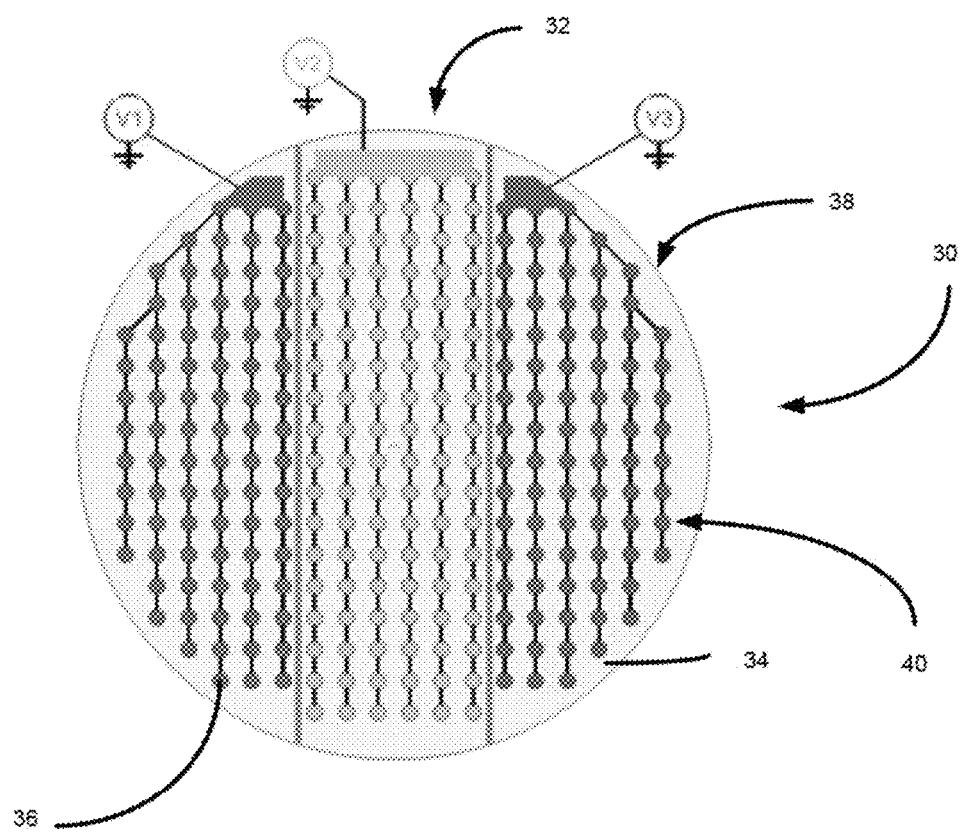
FIG. 4 is a top view of a catalytic plate with multiple electrical routings and trenches with multiple potentials on the same contactors.

FIG. 4 is a top view of a catalytic plate 30 with multiple electrical routings with multiple potentials as needed. The plate is mounted on an electrical contractor pad 32 and includes a plurality of pillars 34 and a plurality of vias 36 with palladium caps. FIG. 4 also illustrates a bulk glass interposer 38. The potential is routed to vias or pillars. Electrical routing, or traces, the conductive path between structures, 40 can be coated with insulation where the potential is only realized in select areas. One plate can have one or more positive and negative potential on one electrode, which is not available in typical plate embodiments. The plate may be a semiconductor solar source wafer to supply power directly to electrodes. A thin layer of semiconductor on glass keeps the translucent capture from the sun. Overlapping traces with dissimilar material can generate potential through various solid state effects. In other embodiments, the interposer may be constructed of a different material, such as ceramic, plastic or any other material. In another embodiment, the metal traces can be dissimilar metal to generate an electromotive force (emf) between dissimilar metal. Similar to how thermocouple works, these dissimilar metals can generate electricity to power a contact point.

Figure 5:
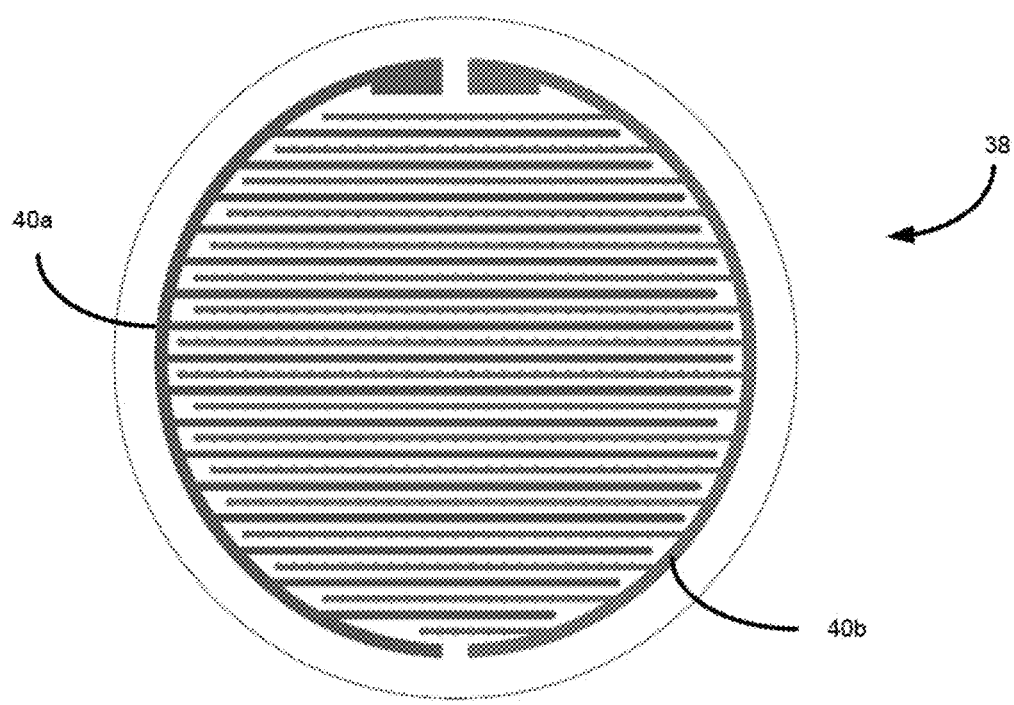
FIG. 5 is a top view of the bulk glass interposer inserted inside a reaction tube of FIG. 4.
Figure 6:
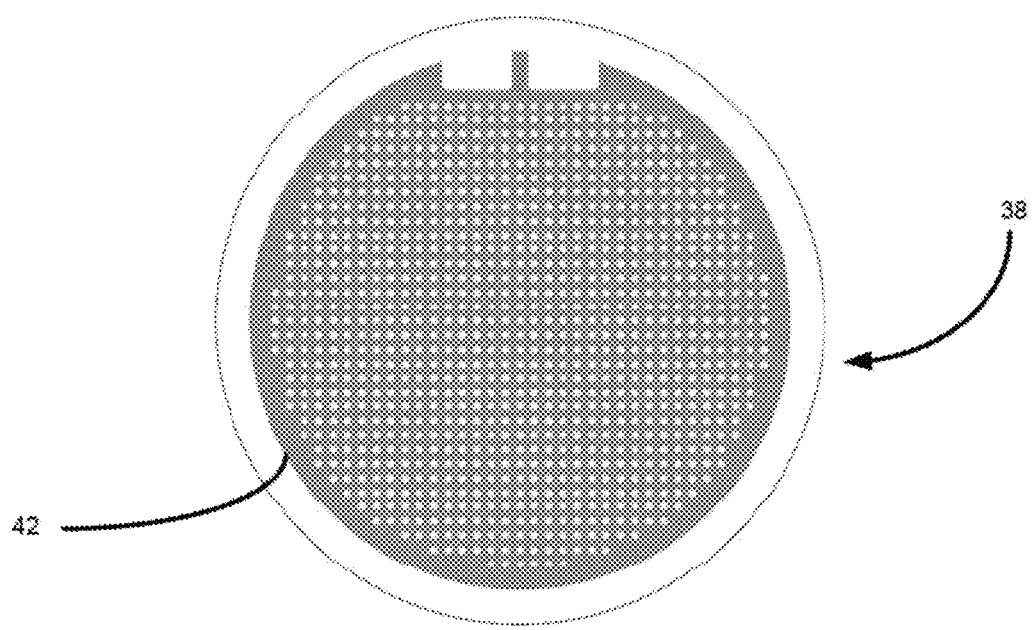
FIG. 6 illustrates the bulk glass interposer of FIG. 4 with passivation.

FIG. 5 is a top view of the bulk glass interposer 38 of FIG. 4. Trace 40a is a metal trace anode on the bulk glass interposer and trace 40b is a metal trace cathode on the bulk glass interposer. FIG. 6 illustrates the bulk glass interposer of FIG. 4 with passivation 42.

Figure 7:
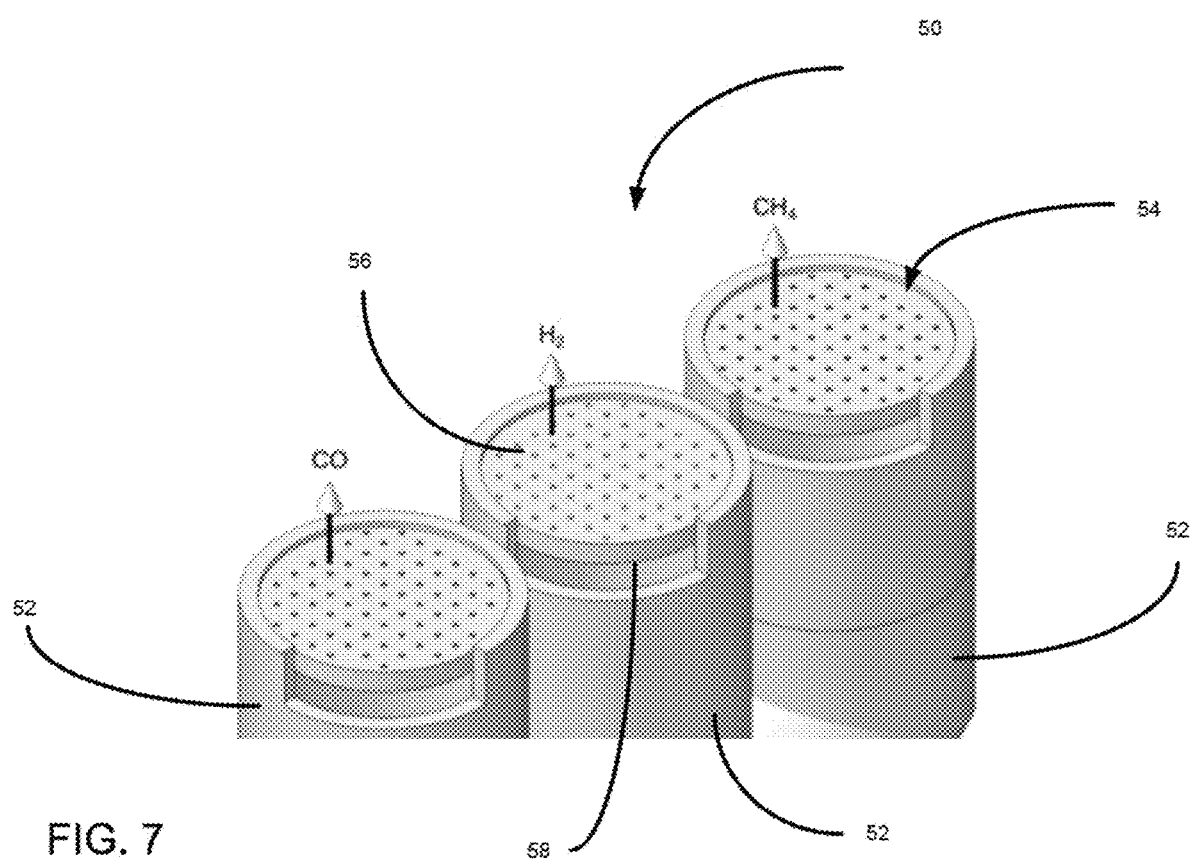
FIG. 7 is a front view of a multi-plate or optional multi-state electrode $CO_2$ system.
Figure 8:
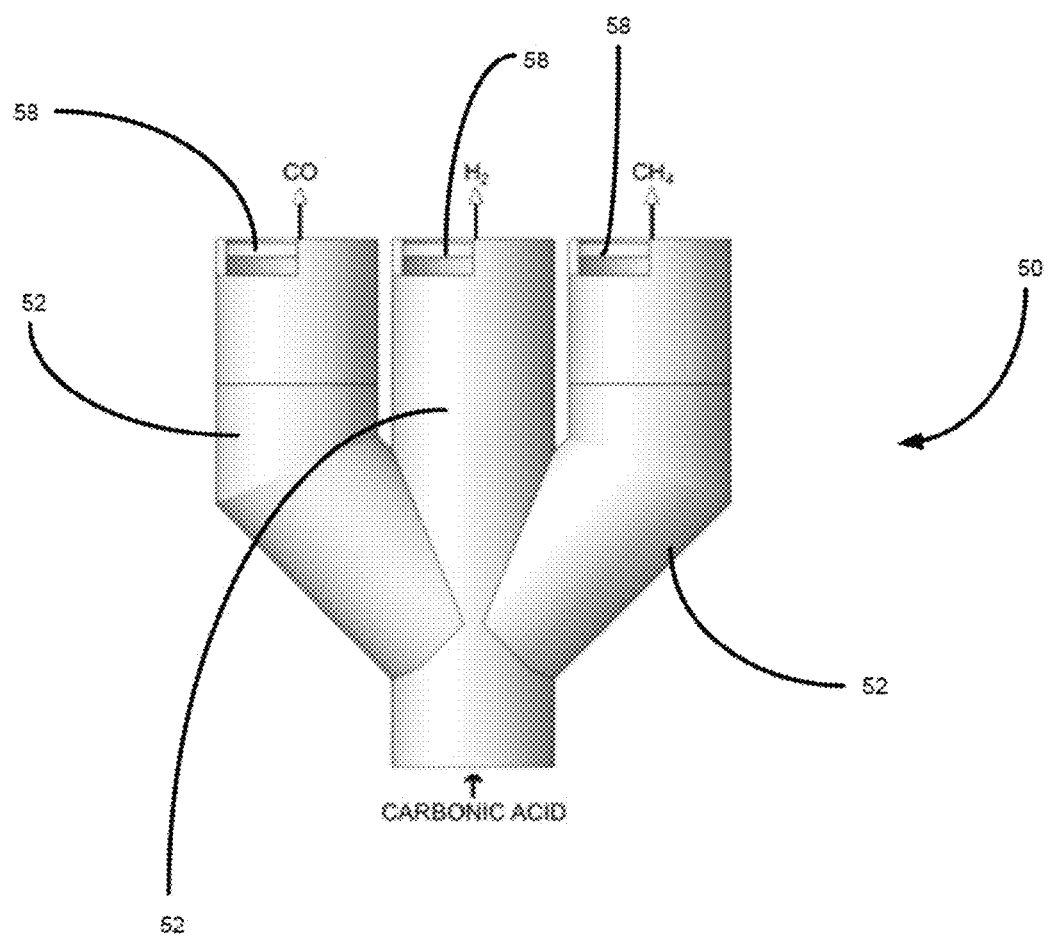
FIG. 8 is a side view of the system of FIG. 7.

FIG. 7 is a front view of a serial multi-plate electrode $CO_2$ system 50. FIG. 8 is a side view of the system 50 of FIG. 7. The plate can be a single cathode, a single anode, or a cathode with multiple states. The system 50 provides examples of tubes with cathodes 58 to support through air or fluid solutions for water or direct air transformation. In the system 50, a plurality of tubes 52 include exit locations 54 for transformed $CO_2$ material. Palladium caps 56 are utilized to purify and filter H2. The system provides an embodiment of utilizing the catalytic plate with multiple gas outputs. Simply changing the electrical potential at the cathode can generate various gas embodiments. The output material is collected in various means. The material can be latter purified and/or densified to various concentrations or liquid solutions. Stacking of cathodes can also be used to increase the proportion of the transformed materials. Electrical power can be supplied by traditional methods or with green or semiconductor type solutions. Capping vias with palladium (Pd) also allows for direct filtering and purification of hydrogen as palladium has natural selectivity and solid state affinity for H2. In a FT process, materials can be recombined to make electrical energy. This embodiment may be useful in filtering blood or algae filtration. As discussed later, a plugged or small via plate can also serve as a PEM membrane in a rechargeable battery.

Figure 9:
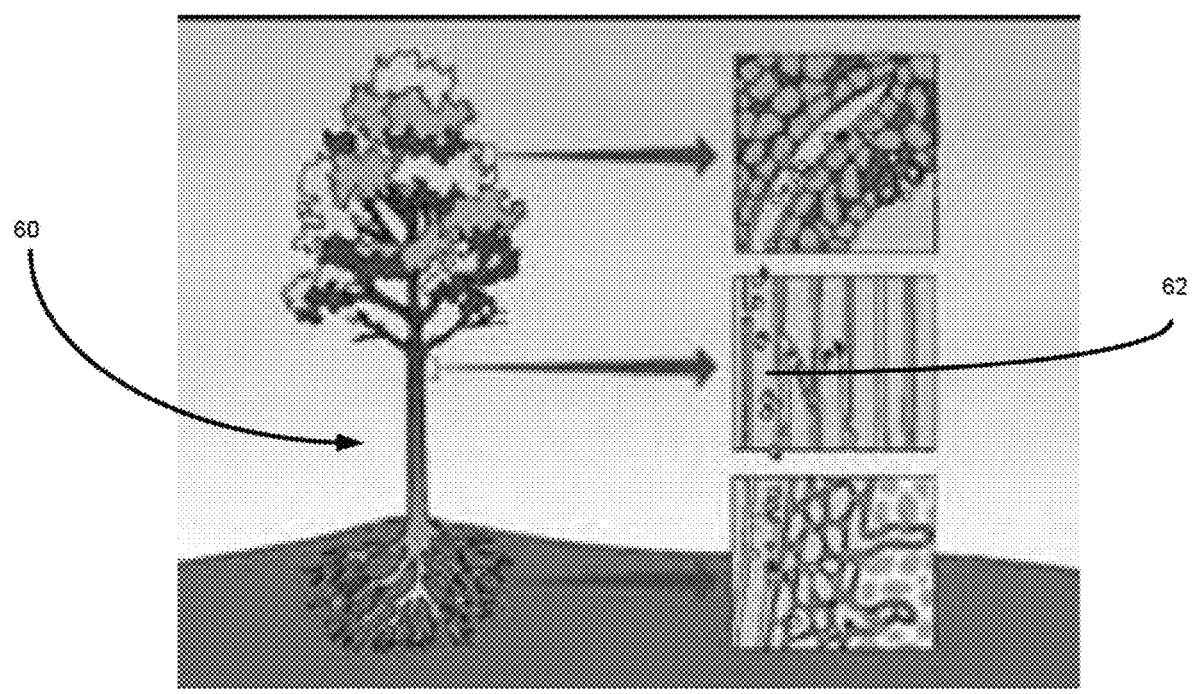
FIG. 9 is a view of a plant demonstrating the capillary effect for water transportation.

FIG. 9 is a view of a plant 60 demonstrating the capillary effect for water transportation. FIG. 9 illustrates how plants use pores (vias 62) to capture $CO_2$, combined with sunlight and chlorophyll, and move nutrients hundreds of feet using capillary effects in larger 0.2 mm to 0.5 mm diameter xylem to manufacture sugars, starches and oxygen in the micropores, xylem, of plants. Such an embodiment has a strong capillary impact. In a smoke-stack example, where one plate might not sequester most of the $CO_2$, the extra plates do indeed capture the material on subsequent interactions.

Figure 10:
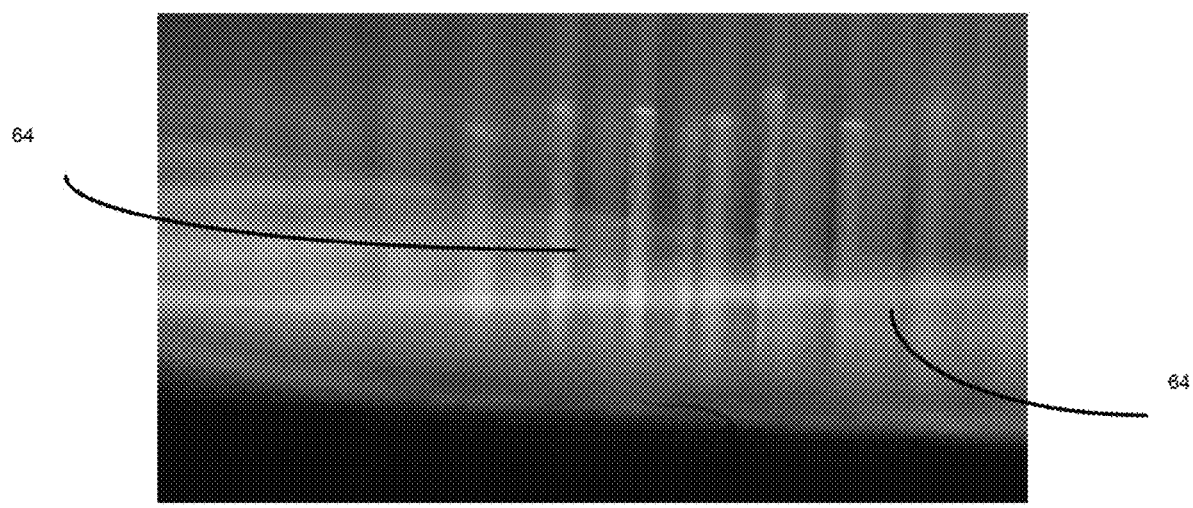
FIG. 10 is a side view of coated and filled through glass via electrode serving as a PEM membrane in a fuel cell or rechargeable battery; (this is a glass exchange membrane—GEM)

FIG. 10 is a side view of coated through glass vias 64 with copper and tin coatings. Glass walls as thins as 5 microns support via density over an order of magnitude higher than natural carbon based structures in plants. In this example, the aspect ratios are over 80:1 supporting capillary effects that would exceed seven feet, thereby eliminating the need for aggressive pumping solutions. It is possible to make such vias with very narrow diameters and tall structures to support incredibly strong capillary forces and repulsion forces. Such a solution makes a superior substitution over a traditional PEM (proton exchange membrane) or AEM (anion exchange membrane) membrane in a fuel cell. Glass, a glass (proton) exchange membrane (GEM) will perform much better than existing organic solutions lasting much longer and operating at higher temperatures. The substrate can be other materials as well and still remain in the scope of the present invention. Placement of proton exchange locations can be fabricated with much better control and density allowing for much higher exchange. Holes can be completely plugged or partially filled. Even coated vias prohibit solution transport when the vias are small as entrapped air only support ion exchange through the metal. Plugged vias are much better at preventing solution transgression. Finally, having palladium (Pd) metal caps support natural filtering of hydrogen as an intrinsic property of Pd is the ability to filter hydrogen. By coating the vias with metal current can transfer through the vias but the small diameter of the vias present a barrier from fluid transfer through the ultra-small diameters. Fluid flow can also be hampered by adding hydrophobic coating while still supporting current flow. In one embodiment of the present invention, a Pd coated via with a Pd cap only allow transmission of H2 protons from one side to the other. As a natural filter, Pd will be the most efficient system.

Figure 11:
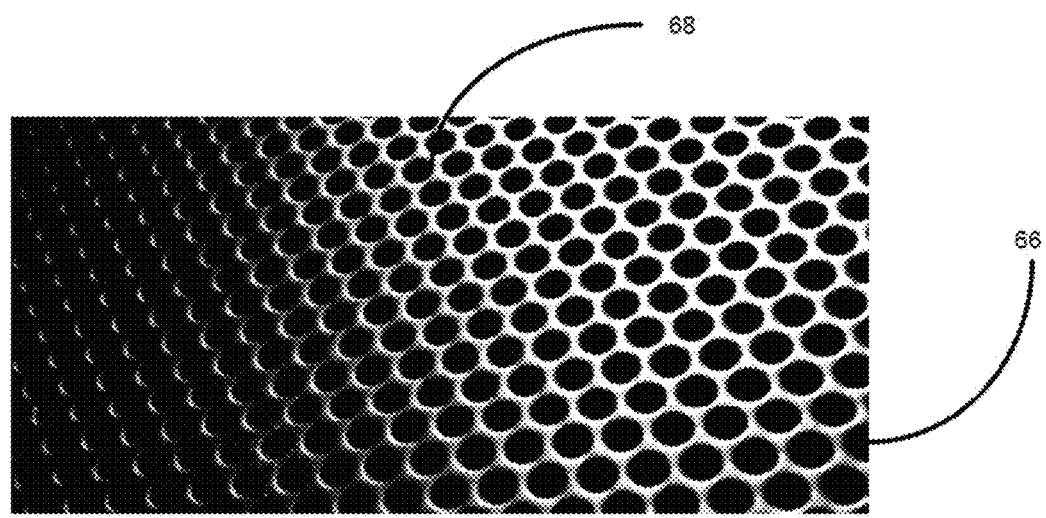
FIG. 11 is a top view of a nickel (Ni) coated 50 micron (thin) glass surface with a plurality of vias.

FIG. 11 is a top view of a nickel (Ni) coated glass surface 66 with a plurality of vias 68. In this embodiment, the Ni metal mesh is five microns thick with 15 micron vias 68 and five micron walls. Such embodiments work in aggressive salt environments as well as barriers for electric batteries as an isolation barrier, ion transport, etc. This embodiment can be a stand-alone metal mesh or a metal on thin substrate. In one embodiment utilizing a specified metal such as silver, the present invention may be utilized in blood filtering.

Figure 12:
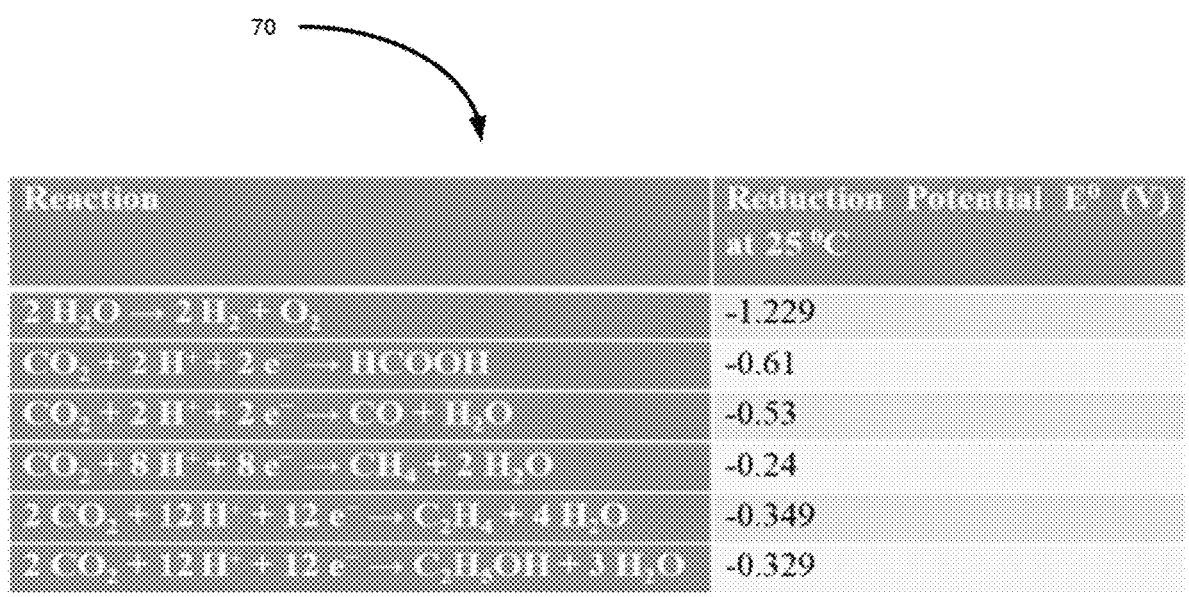
FIG. 12 is a chart illustrating reaction kinetics for $CO_2$ conversion using copper as the metal in CEC cathode plates.

FIG. 12 is a chart 70 illustrating is one reaction kinetics for $CO_2$ conversion using copper/tin CEC cathodes. The reaction of improved catalytic plates enables the realization of $CO_2$ transformation using photoelectrochemical and other solid state approaches. This chart reviews copper, tin, and palladium. The present invention is not limited to these materials and may utilize other material for $CO_2$ transformation.

Figure 13:
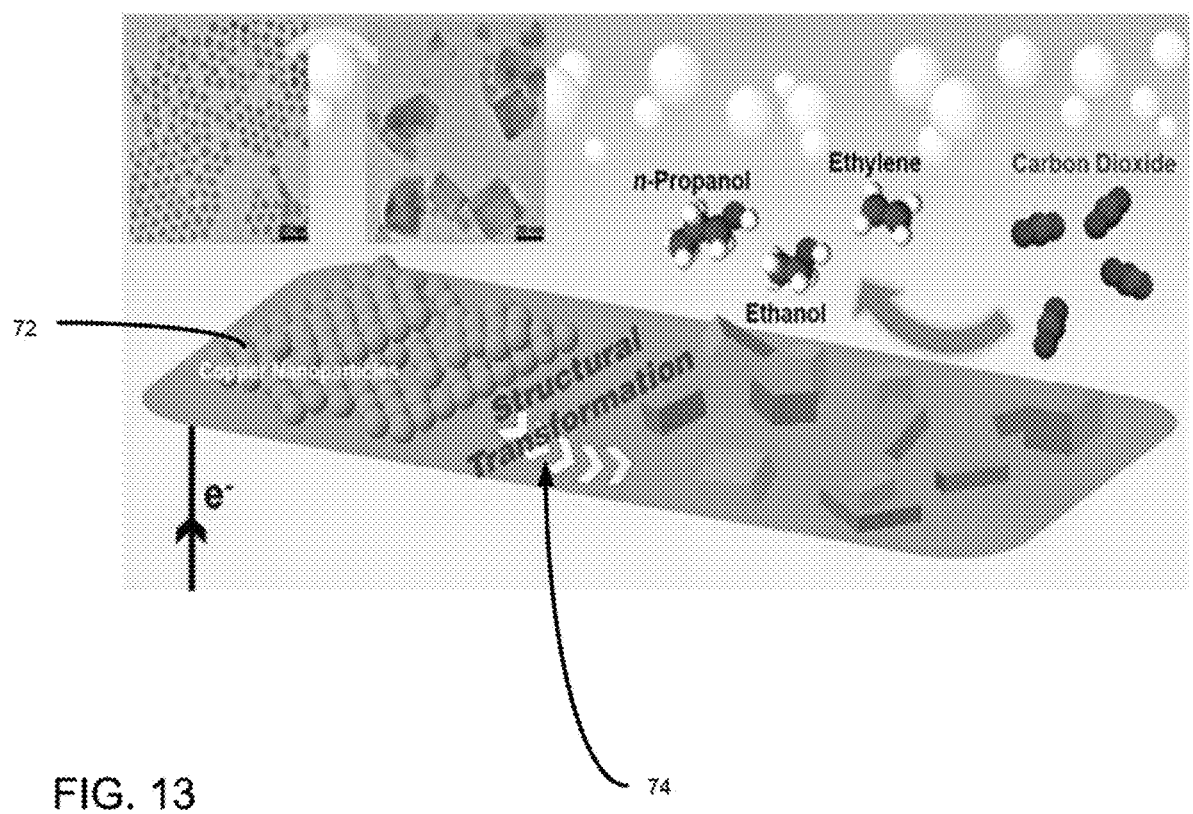
FIG. 13 is an illustration of the reactions of copper particles with $CO_2$ and the transformation materials.

FIG. 13 is an illustration of the reactions of copper particles 72 with $CO_2$ and the transformation materials 74. Several by-products of reduction of carbon dioxide with copper catalyst may be realized. Selective bias allows targeting of exit repurposed materials. Copper is just one metal and is only example. In other embodiments, a different catalyst may be utilized. When renewable energy is utilized, a low power embodiment is possible. Solar or even air flow can power (fans) to generate electricity to support catalytic reactions.

Figure 14A:
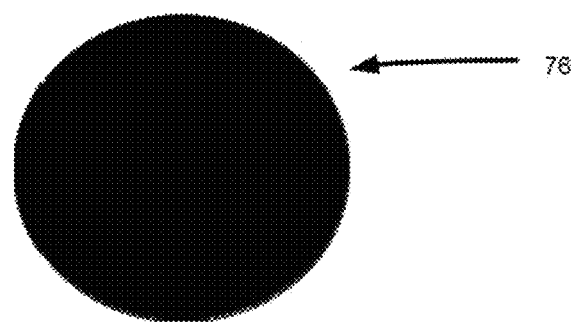
FIG. 14A is a top view of a through CEC metal plate/foil used for medical applications.
Figure 14B:
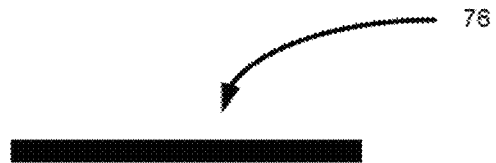
FIG. 14B is a side view of a CEC plate of FIG. 14A.

FIG. 14A is a top view of a CEC plate 76. FIG. 14B is a side view of a CEC plate 76 of FIG. 14A. The plate may either be an electrically biased coated through via solution (or combo pillar/via) powered by and energy source, preferably renewable. The CEC plate may be utilized for various applications, such as medical applications. For example, in dialysis blood is filtered for impurities. By using a through via solution, the metal can be silver or copper which is toxic to many microbes. Hence blood could be filtered while also killing microbes with a CEC plate.

Figure 15:
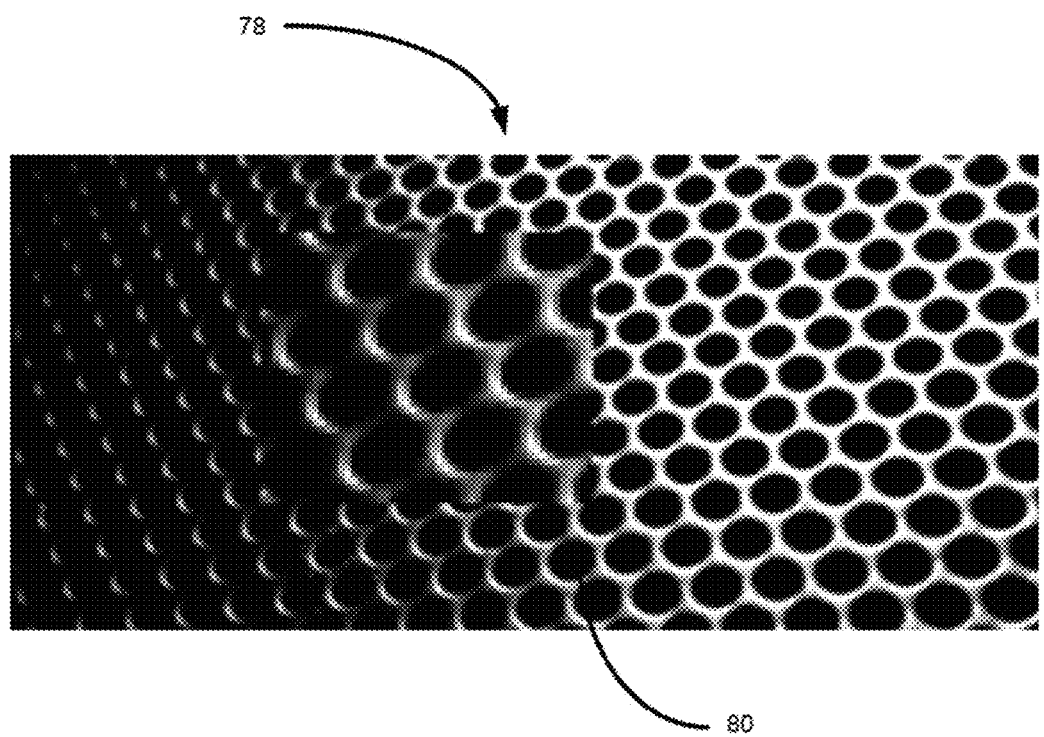
FIG. 15 is an enlarged top view of a catalytic coated thru via electrode cathode for a fuel cell or $CO_2$.

FIG. 15 is an enlarged top view of a catalytic coated thru via electrode on the cathode plate 78. The surface of the plate 78 illustrates a plurality of through holes 80. Such density of holes increases the catalytic surface. Electricity can also be routed to individual coated vias. Center zoom shows the narrowness of the walls and ability to behave as a compliant mesh solution.

Figure 16:
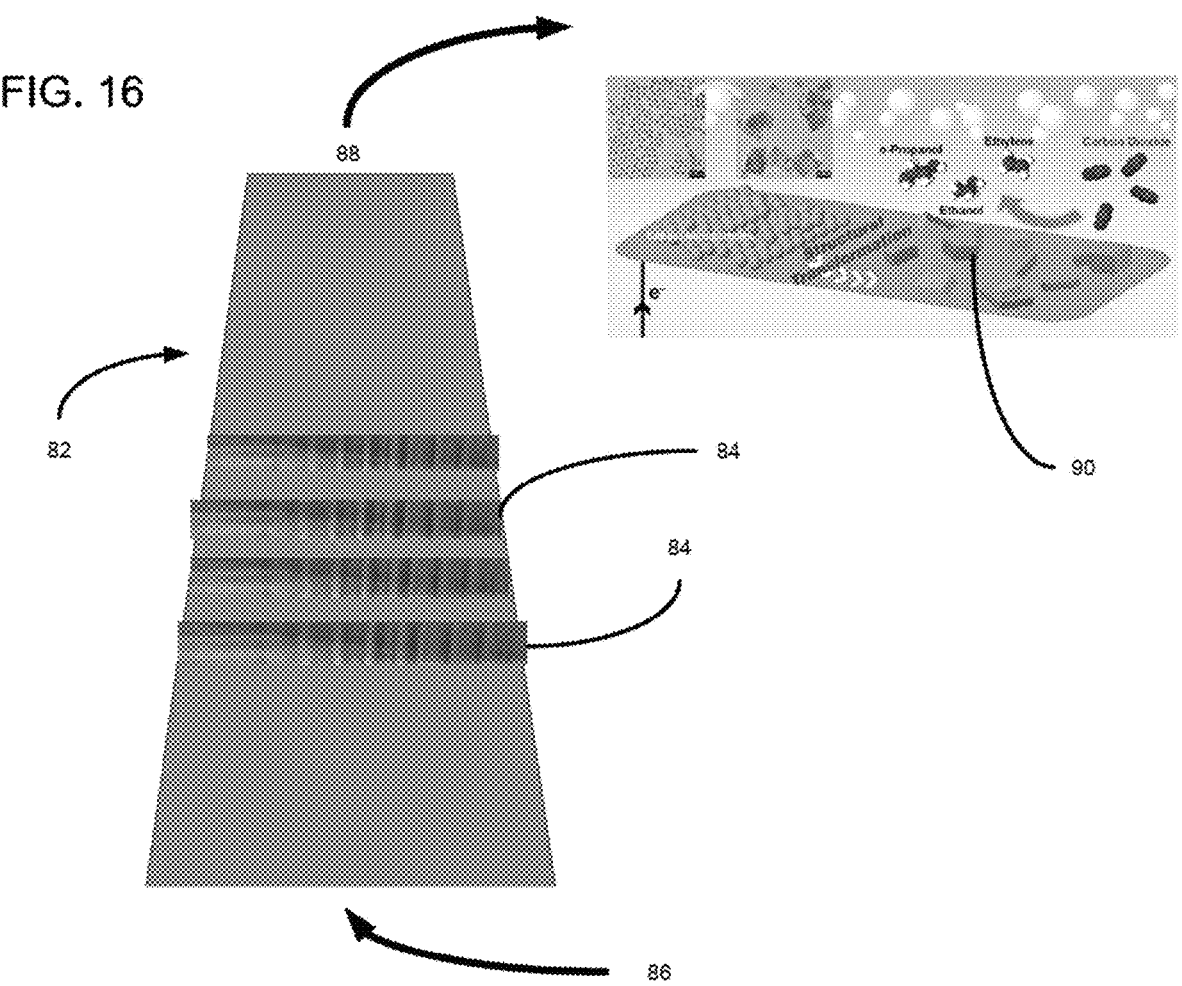
FIG. 16 is an illustration of a direct air capture cooling tower having a multitude of CEC plates highlighting input, reaction plates and possible output materials.

FIG. 16 is an illustration of a direct air capture cooling tower 82 having parallel CEC plates 84. The tower includes a feeder flow inlet 86 and an exit 88. With the feeder flow inlet 86, $CO_2$ composition may or may not have a carrier medium. The $CO_2$ reacts with the CEC plates 84 to be repurposed from waste to beneficial materials. These materials exit out exit 88. Illustration 90 shows an example of the exit gas materials. The CEC plates may be electrically biased, coated through vias or a combination pillar/via powered by an energy source, preferably renewable. Parallel plates provides transformation after passage through each plate. With each passage a higher percentage of transformed material results. A system of plates may be stacked to increase the ratio of transformed material after each passage. For example, the first wafer might have only 10% efficiency yielding a 90% transformed material. After passage through a second wafer, that 90% improves the transformation to 81% yield (100-90-9). A third wafer may then convert that 81% to 8.1% additional material where the original 100% $CO_2$ has 100-90-9-8.1 or 72.9% $CO_2$ and 27% repurposed material. If such a solution is placed in carbonic acid bath, a 40% to 50% alcohol ratio is considered flammable taking approximately 8-10 wafers. Such light wafers could easily fit in a small and light weight area making power available in the most remote areas. Such a system would also work in an exhaust tower converting $CO_2$ on each subsequent passage.

There are several examples of filtration applications using TGV cathodes. Normal human red blood cells have a biconcave shape having a diameter of approximately 7-8 microns and a thickness of approximately 2.5 microns. Smaller or larger sizes of cells may indicate medical conditions, such as cancer. Additionally, algae filtration may be utilized for renewable fuels. TGV cathodes may also be used for general filtration in many fields as well as electrophoresis.

Figure 17:
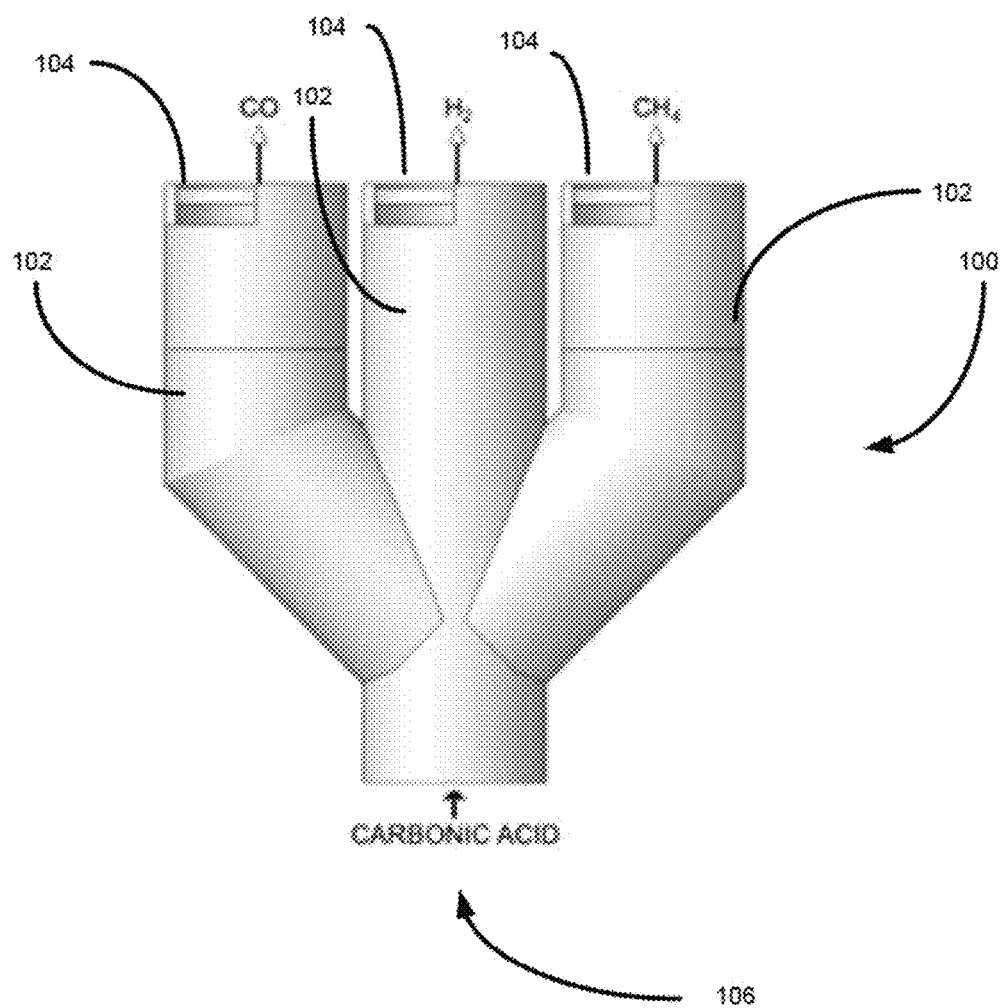
FIG. 17 is a side view of a multi-plate electrode $CO_2$ dual system insert to highlight multiple gas possibilities embodiment of the present invention.

FIG. 17 is a side view of a multi-plate multi-purpose electrode $CO_2$ system 100. The plate can be a single cathode, a single anode, or a cathode with multiple states. The system 100 includes a plurality of tubes 102 with cathodes 104. Water arrives as carbonic acid (or near zero $CO_2$ liquid) at entry point 106 and is converted to $O_2$ (which is breathable), $H_2$ and $CH_4$. The $H_2$ and $CH_4$ may be diverted to a fuel cell for power.

Figure 18:
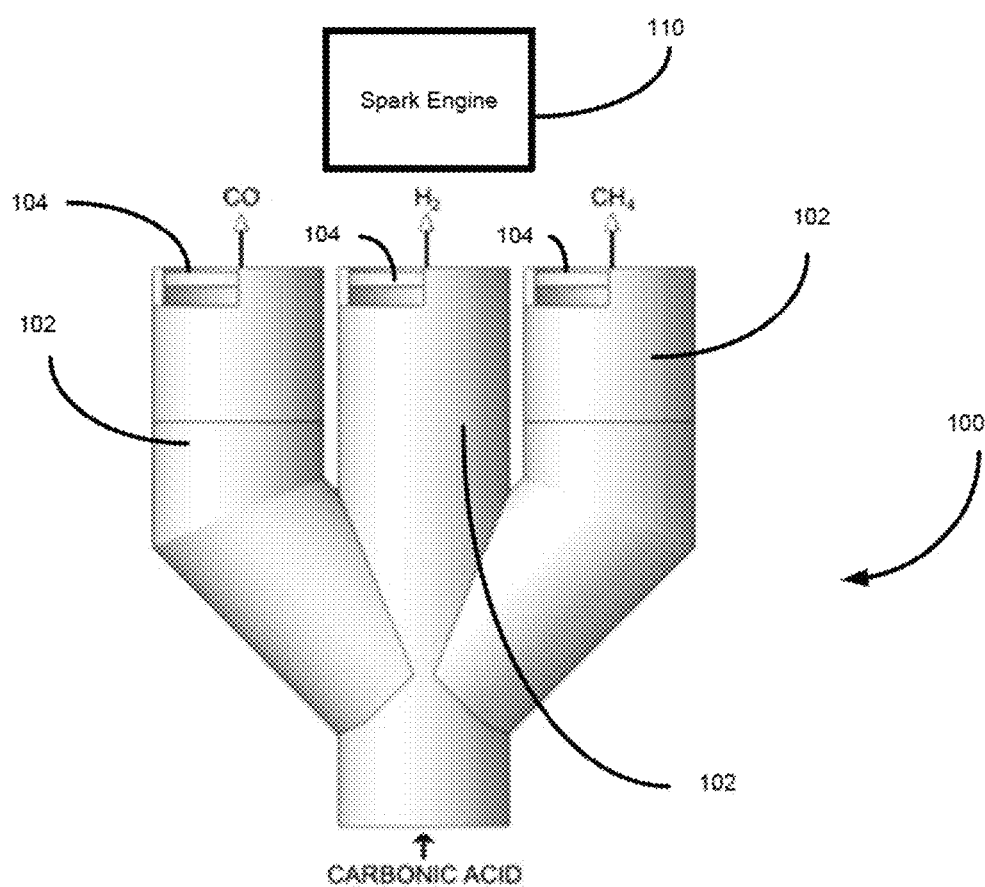
FIG. 18 illustrates the system of FIG. 17 with a sparking system serving as an engine as an option.

FIG. 18 illustrates the system 100 of FIG. 17 with a sparking system 110. After separation of $O_2$, $CH_4$ and/or $H_2$, the sparking system 110 (spark engine) may be added to make a new engine where water-laden $CO_2$ provides direct fuel and fuel cell materials. A reaction of $O_2$ and $CH_4$ produces large amounts of heat; a reaction with Ha generates heat and water; and a reaction with CO and a copper oxide catalyst yields heat and $CO_2$. The precursors may also be used in a FT process to make longer chain carbon compounds, such as jet fuel, diesel, kerosene, plastics, et. As a review, the Fischer-Tropsch (FT) process is a collection of chemical reactions that converts a mixture of carbon monoxide and hydrogen or water/gas into liquid hydrocarbons. These reactions occur in the presence of metal catalysts, typically at temperatures of 150-300° C. (302-572° F.) and pressures of one to several tens of atmospheres. The FT process involves a series of chemical reactions that produce a variety of hydrocarbons, ideally having the formula $(C_nH_{2n+2})$. The more useful reactions produce alkanes as follows:

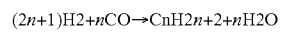

$$(2n+1)H2 + nCO \rightarrow CnH2n+2 + nH2O$$

where n is typically 10-20. The formation of methane (n=1) is unwanted. Most of the alkanes produced tend to be straight-chain, suitable as diesel fuel. In addition to alkane formation, competing reactions give small amounts of alkenes, as well as alcohols and other oxygenated hydrocarbons. The FT reaction is a highly exothermic reaction due to a standard reaction enthalpy ($\Delta H$) of −165 KJ/mol CO combined. In addition, electrodes as described above may be inserted in the intake area above entry point 106 with a power sources. In this system, the cathode side generates $CO/H_2/CH_4$ while the anode generates oxygen.

Figure 19:
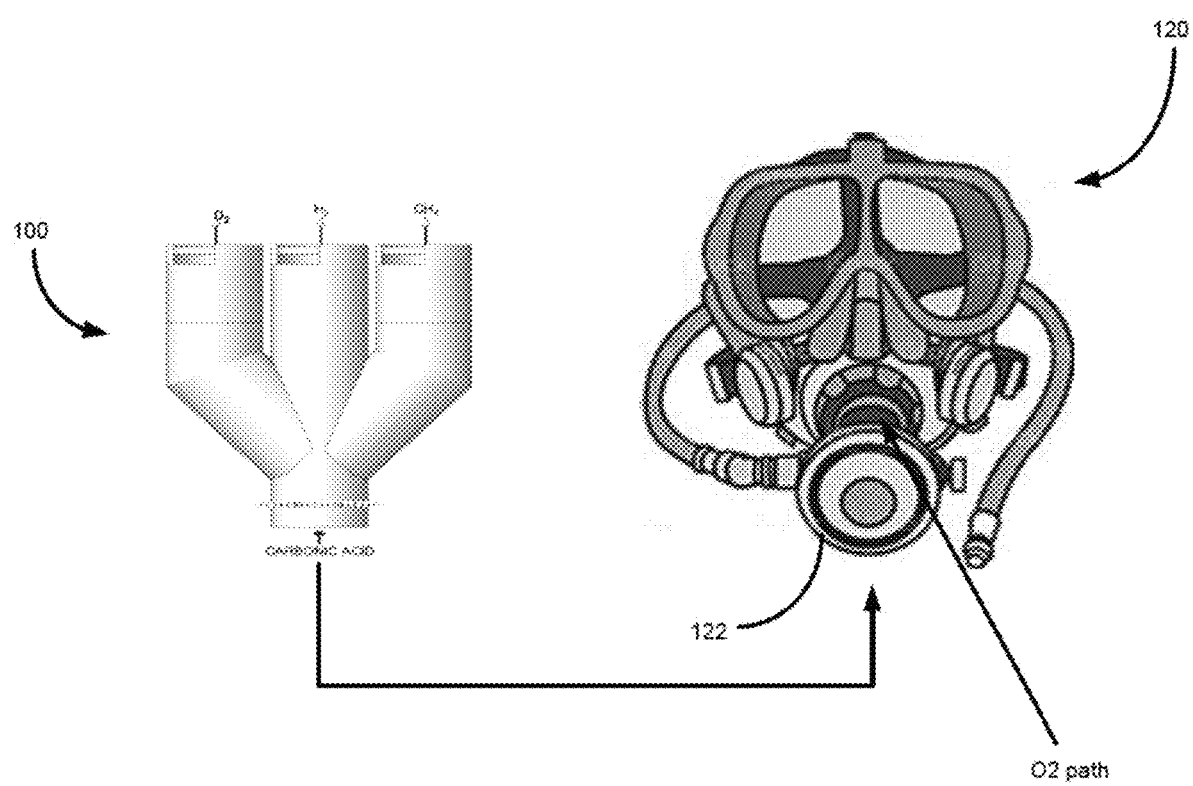
FIG. 19 illustrates a scuba system utilizing the system of FIG. 17 where the $H_2$, $O_2$ and other gases can generate power as well as breathable air.

FIG. 19 illustrates a Scuba system 120 utilizing the system 100 of FIG. 17. The system 100 is inserted into an entry path of a mouthpiece 122. Power is supplied and oxygen follows the path to the human down the anode path. Other gases can be combined later in an EV system or stored to as fuel to power system battery electrochemically. In this embodiment, oxygen may be provided to a diver. A GEM membrane replaces a standard PEM/EAM membrane as an improvement.

Figure 20:
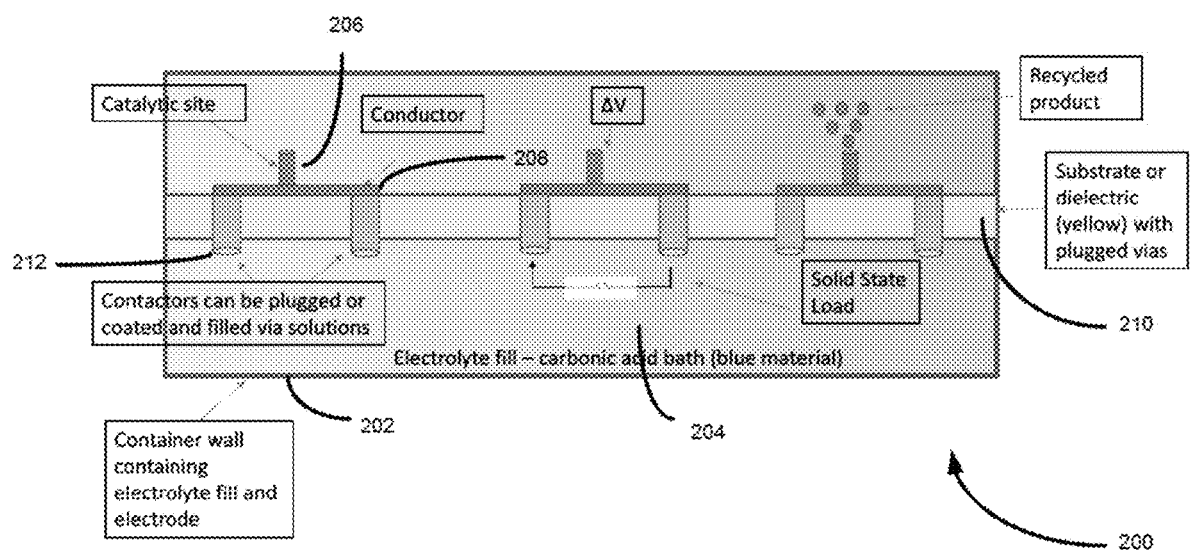
FIG. 20 is a block diagram of a solid state system providing some or all in-situ power to catalytic sites.

FIG. 20 is a block diagram of a solid state system 200 for self-power sites, such as using Seebeck, Peltier or Thomson effect for power generation. The system 200 includes a container wall 202 having electrolyte fill 204 and electrodes. The system also includes a catalytic site 206, a conductor 208, and a substrate or dielectric 210 with plugged vias. In addition, contactors 212 may be plugged or coated and filled via solutions. This embodiment illustrates connecting two dissimilar metals which then generates an electrical charge. This charge is similar to how a thermocouple works (Seebeck, galvanic, thermoelectric, etc.) to build a charge with each connection. That charge is proportional to temperature, light and other solid state effects. It is possible to build such a system where the power is self-sustained and the nanocontactors at the end provide the $CO_2$ transformation sites.

Figure 21:
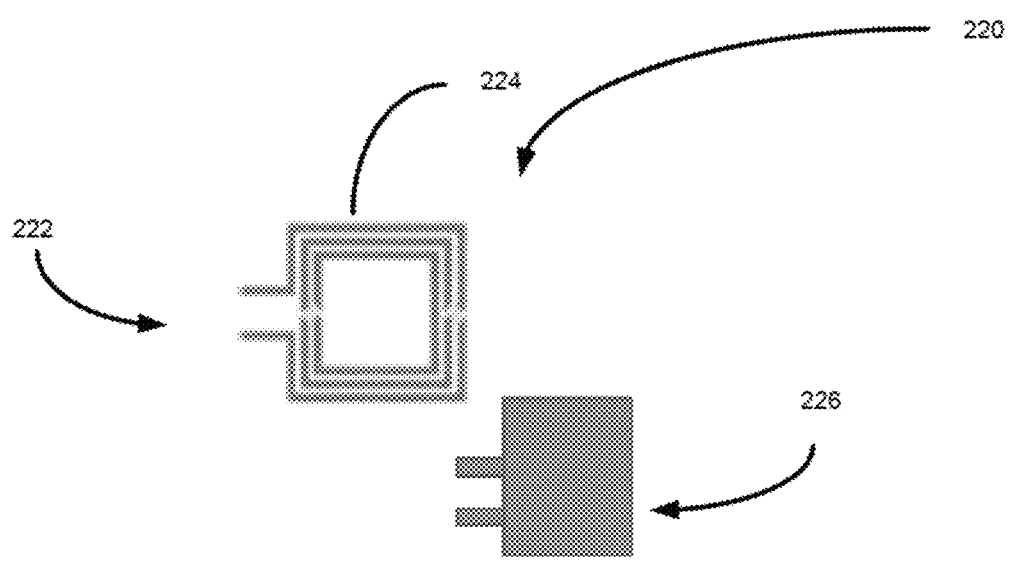
FIG. 21 illustrates a top view and bottom view of a radio frequency energy harvesting system.

FIG. 21 illustrates a radio frequency energy harvesting system 220 with a small antennae. The system 220 illustrates a top view of a spiral inductive antennae 224 and a patch antennae 226 for energy harvesting. The catalytic site may be attached to the end of the leads 222 as the $CO_2$ transformation site. The coil (spiral inductive 224) and higher frequency patch shows how radio frequency energy can be used in a transformative $CO_2$ solution. Radio frequency can be used to power the site providing radio frequency energy to excite the solution while also providing power to the device.

Figure 22A:
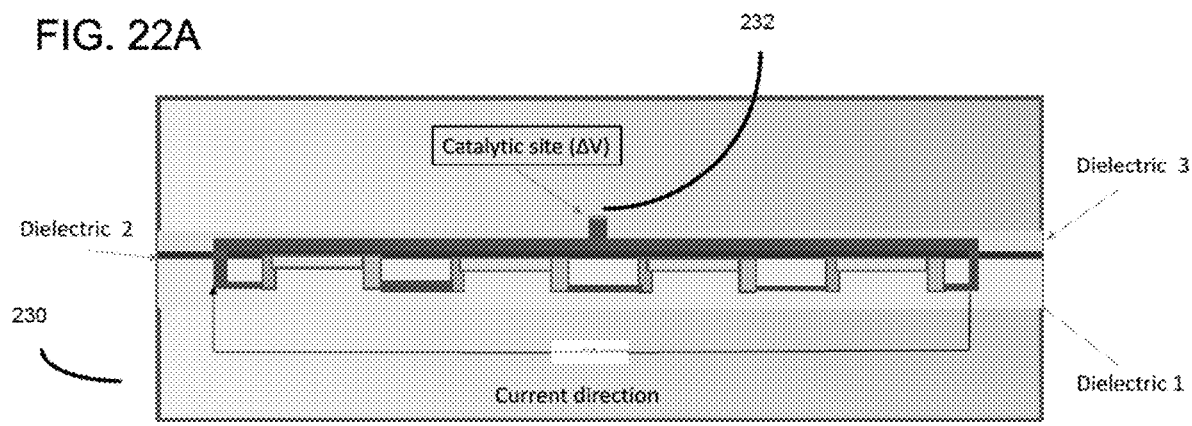
FIG. 22A is a simplified block diagram of a positive, negative, positive negative, positive, negative (pnp-npn) solid state energy generation system in another embodiment of the present invention.
Figure 22B:
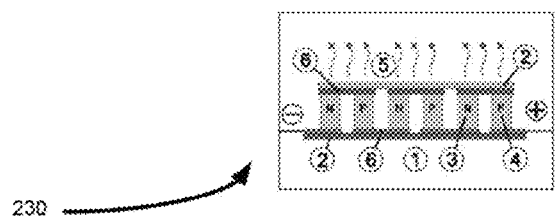
FIG. 22B is a side view showing the charges of the system of FIG. 22A.

FIG. 22A is a simplified block diagram of a solid state energy generation; p designates excess holes or positive whereas n designate excess electrons or negative. Positive, negative, positive-negative, positive, negative (pnp-npn) system 230 in another embodiment of the present invention using an inorganic and organic plugged and partially plugged vias. The system 230 includes a catalytic site (delta V) 232, a dielectric 1, dielectric 2, and dielectric 3. FIG. 22B is a side view showing the charges of the system 230 of FIG. 22A. This embodiment is capable of generating energy from thermoelectric, photoelectric, galvanic, Seebeck, Thomas, galvanic, Peltier, etc. solid state solutions. The more junctions, the more voltage at the catalytic site.

Figure 23A:
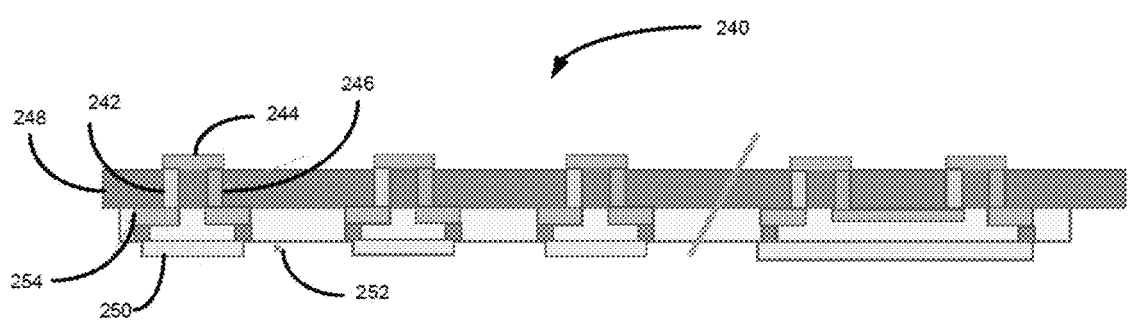
FIG. 23A is a block diagram of solid state energy generation system having high density stacking.
Figure 23B:
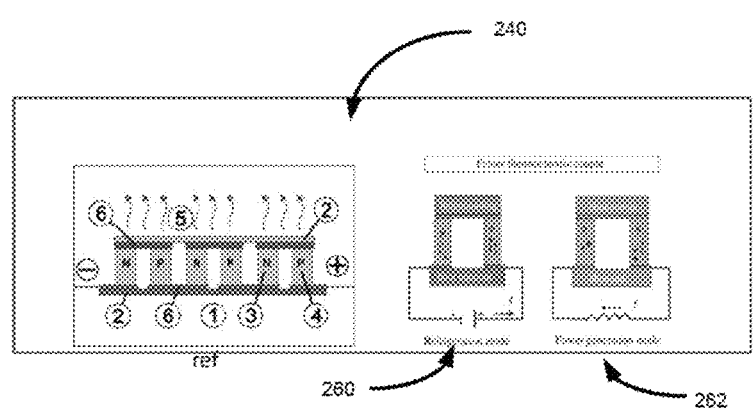
FIG. 23B illustrates a side view of the solid state energy generation system of FIG. 23A.

FIG. 23A is a block diagram of solid state energy generation system 240. The system 240 may include n-type material 242, a conductor or electrode 244, p-type material 246, a dielectric 248 having through glass, silicon, ceramic, polymer, etc. Furthermore, the system includes a conductor or electrode 250 and a dielectric 252 having organic or inorganic passivation. FIG. 23B illustrates a side view of the solid state energy generation system 240 showing the refrigeration mode 260 and the power generation mode 262 for use as a Peltier thermoelectric couple. The various components show two ways to increase the density of multiple site features on a substrate (catalytic sites are not included for clarity). As noted, current direction goes from holes (p) to electrons (n). Simply changing the contactor location may change the current path switching from anode to cathode.

Figure 24A:
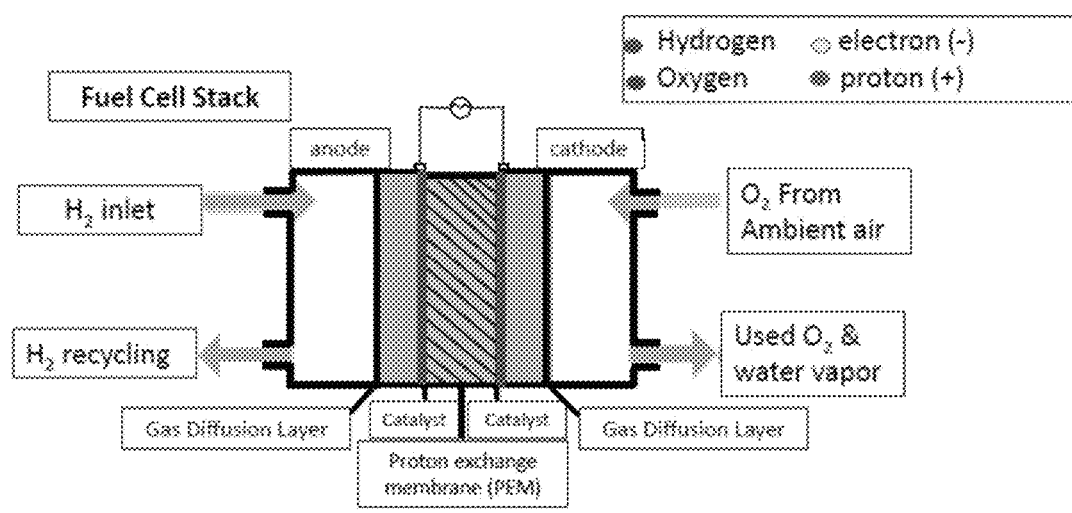
FIG. 24A is a block diagram illustrating a PEM rechargeable battery in another embodiment of the present invention.
Figure 24B:
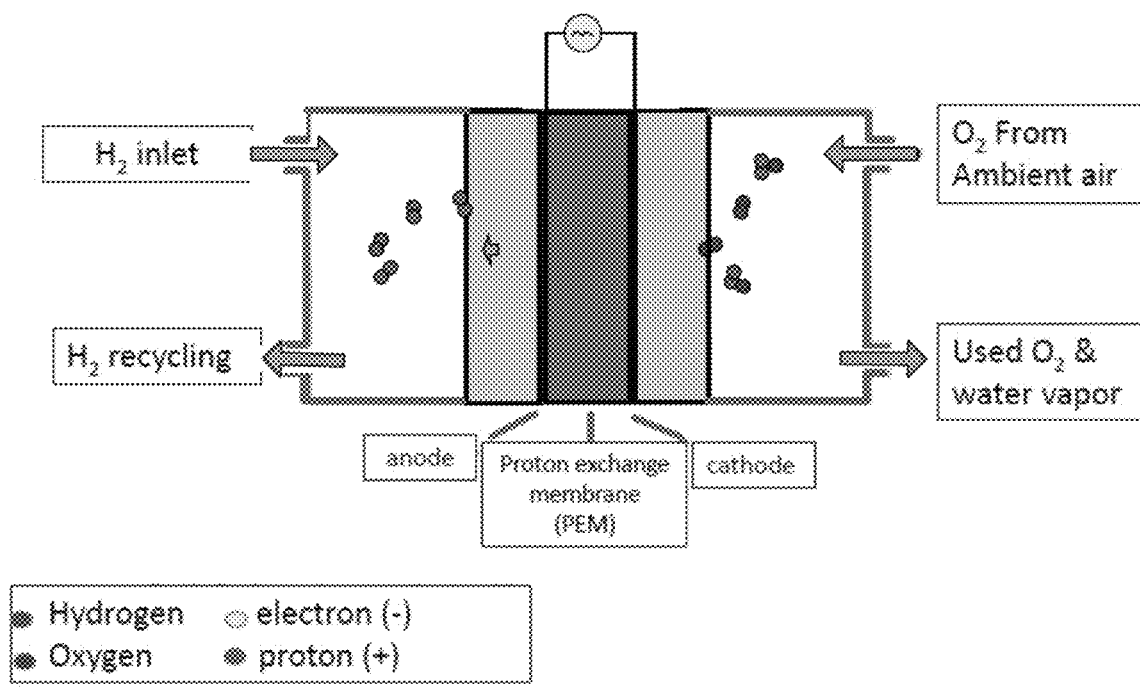
FIG. 24B is a block diagram illustrating a PEM rechargeable battery in another embodiment of the present invention.
Figure 24C:
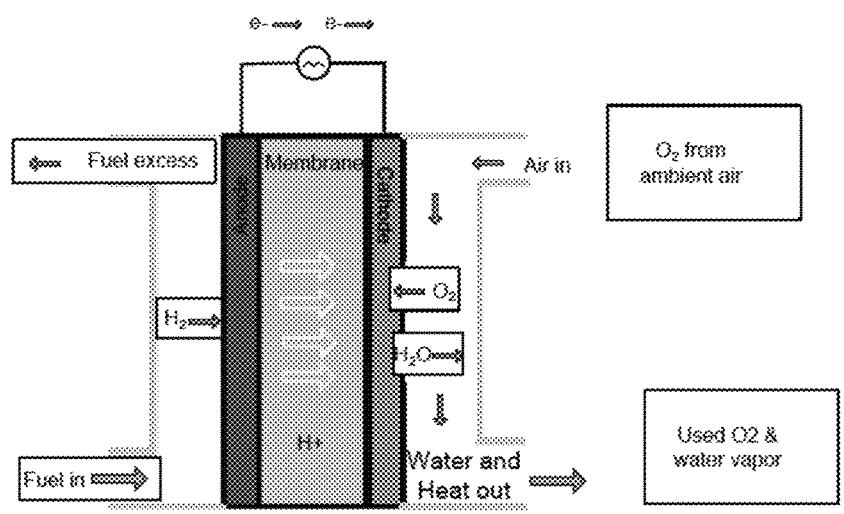
FIG. 24C is a block diagram illustrating a rechargeable battery in another embodiment of the present invention.
Figure 24D:
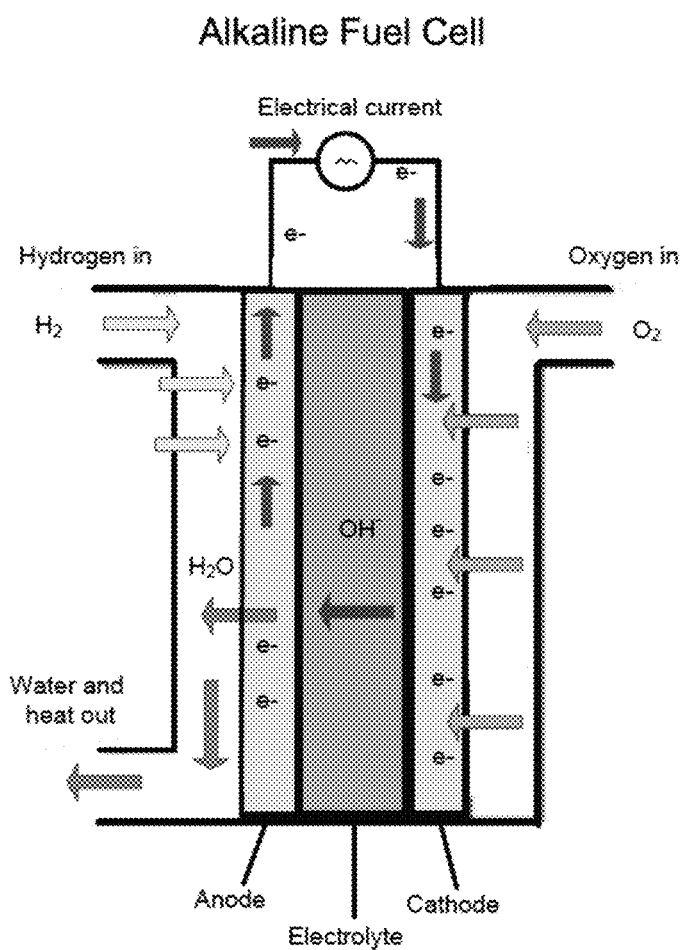
FIG. 24D is a block diagram illustrating a rechargeable battery in another embodiment of the present invention.
Figure 24E:
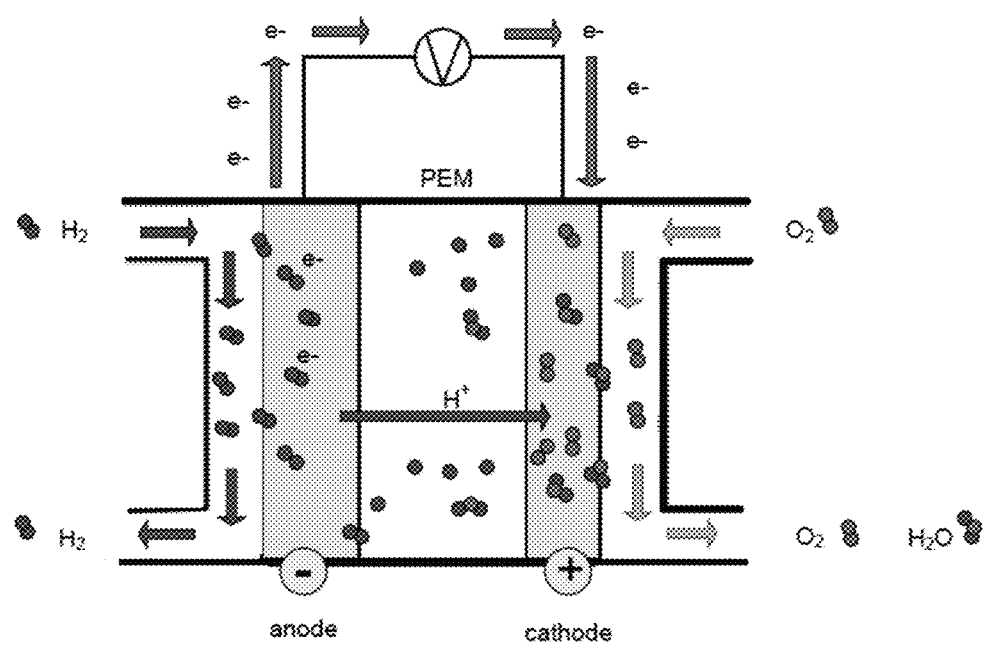

FIGS. 24A-24E are block diagrams of PEM and AEM rechargeable batteries in another embodiment of the present invention. In another embodiment, the GEM solution replaces the membrane and possibly the anode and cathode with plugged and coated vias. Specifically, FIG. 24A is a block diagram illustrating a PEM rechargeable battery in another embodiment of the present invention. FIG. 24B is a block diagram illustrating a PEM rechargeable battery in another embodiment of the present invention. FIG. 24C is a block diagram illustrating a rechargeable battery in another embodiment of the present invention. FIG. 24D is a block diagram illustrating a rechargeable battery in another embodiment of the present invention. FIG. 24E is a block diagram illustrating a rechargeable battery in another embodiment of the present invention. A palladium plugged and/or capped embodiment also allows the natural filtration of $H_2$.

Figures 25A, 25B:
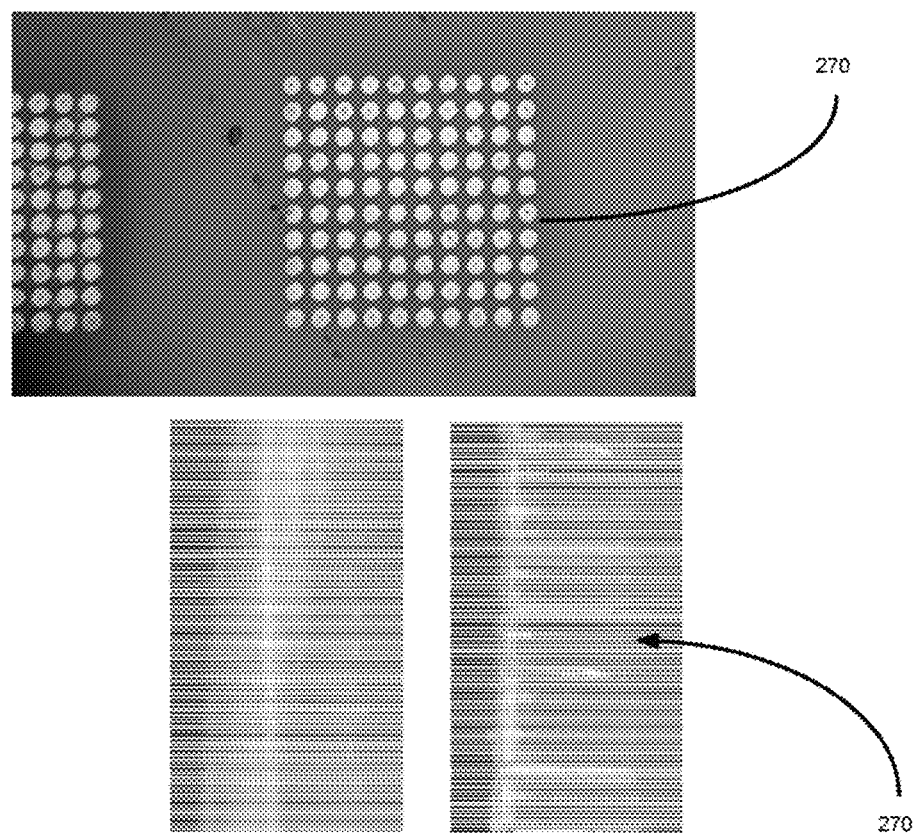
FIG. 25A is a top view of a 3D GEM structure in another embodiment of the present invention.
FIG. 25B is a side view of the GEM structure of FIG. 25A.

FIG. 25A is a top view of a 3D GEM structure 270 in another embodiment of the present invention. FIG. 25B is a side view of the GEM structure 270. The structure is plugged and coated for a 3D GEM embodiment. Copper is one example utilized on through vias for charge transport. Other metals and oxides are possible to facilitate this charge transport. Pd caps provide a natural $H_2$ filter to support a water (excess $H^+$) and air charging system. In addition, copper plated vias may be utilized for the catalytic surface. Additionally, glass is much more impermeable than many organic or inorganic fiber. Glass, and other substrates such as ceramic, operate at high temperature for improved efficiency and durability. Either plugged or just coated, the GEM barrier prevents cross contamination of electrolytes while providing metal inserts to transfer charge. A palladium cap supports a natural transfer of pure hydrogen. With water composed of H and OH pairs, it may be possible to make a solution of just water and outside air to generate power.

Figure 26:
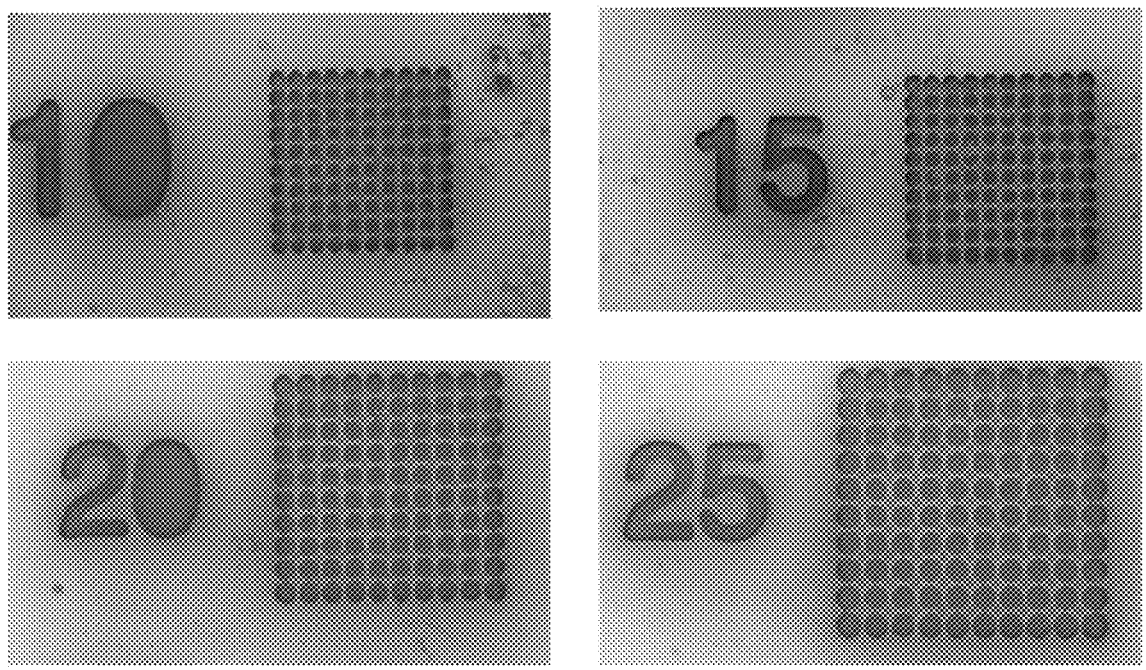
FIG. 26 illustrates top views of high density coated 3D GEM vias with 10, 15, 20 and 25 μm diameters and 5 μm walls.
Figure 27:
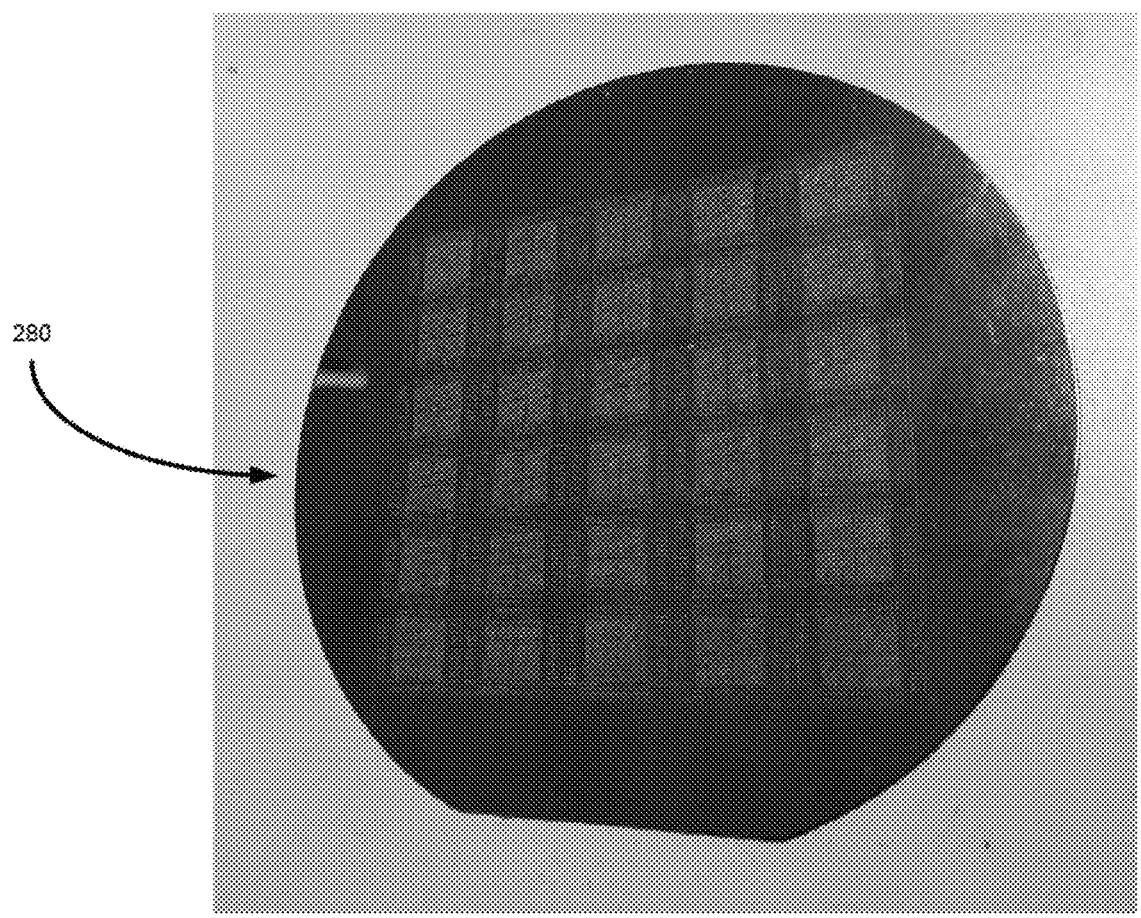
FIG. 27 illustrates a fully fabricated 3D surface cathode.

FIG. 26 illustrates top views of high density coated 3D GEM vias with 10, 15, 20 and 25 um diameters and 5 um walls. FIG. 26 shows the capability to fabricate much higher density controlled structures of a 3D-GEM or any other 3D CEC cathode/anode embodiment. These 3D vias could be used in other applications as described above and all previously disclosed applications. FIG. 27 illustrates a fully fabricated 3D cathode 280 using one of many materials; in this case silicon nitride substrate.

The present invention provides a $CO_2$ capture and sequestration system which uses semiconductor microfabrication techniques to fabricate high density catalytic features on or within a substrate, a transposer. In addition, the present invention provides various distinct embodiments and applications for use in various industries.

Thus, the present invention has been described herein with reference to a particular embodiment for a particular application. Those having ordinary skill in the art and access to the present teachings will recognize additional modifications, applications, and embodiments within the scope thereof.

What is claimed is:

1. A catalytic system for capture, sequestration and transformation, the system comprising:

a cell for containing material in a carrier medium, the cell having an electrode generating oxygen, hydrocarbons, oxides of carbon or hydrogen from the material in the carrier medium;

a power supply for providing electrical power to the electrode, wherein an electrolytic process occurs whereby oxygen, hydrogen, oxides of carbon or hydrocarbon precursors are produced;

wherein the electrode includes a plurality of geometrical constructs to increase an active surface area of a catalytic surface of the electrode to increase an efficiency of an electrolytic process;

wherein the electrode includes through via constructs:

wherein each geometrical construct of the plurality of geometrical constructs provides electrical, catalytic and capillary control.

2. The catalytic system according to claim 1 wherein the catalytic system is placed in an carrier system to convert $CO_2$ based materials into repurposed material.

3. The catalytic system according to claim 2 further comprising a structure configured to located in the catalytic system in-situ with the structure;

wherein the structure is configured to enable $CO_2$ flow over or through the electrode for converting $CO_2$ based substances to transformed material.

4. The catalytic system according to claim 1 wherein:

the plurality of geometric constructs includes a plurality of vias or pillars to increase the surface area of the catalytic surface;

the plurality of vias provides additional capillary action across the catalytic surface.

5. The catalytic system according to claim 1 wherein the electrode includes three dimensional constructs.

6. The catalytic system according to claim 5 wherein the three dimensional electrode removes or transforms $CO_2$ carried in a liquid, gas or solid.

7. The catalytic system according to claim 5 wherein the three dimensional electrode facilitates the transformation of $CO_2$ into hydrocarbons, hydrogen, and oxides of carbon.

8. The catalytic system according to claim 6 wherein the three dimensional electrode converts the hydrocarbons and oxides of carbon to long chain carbon compounds.

9. The catalytic system according to claim 1 wherein the electrode supports separating gases in a cell into oxygen and fuel gases for an underwater breathing or propulsion system.

10. The catalytic system according to claim 1 wherein high density catalytic features are fabricated on an electrode the anode or the cathode, the high density catalytic features being fabricated using microfabrication techniques.

11. The catalytic system according to claim 1 wherein the through via of the electrode is a three dimensional electrode configured for use in an internal combustion engine for reverting NOx, SOx or COx into fuels, oxidizer or inert materials.

12. A catalytic system for $CO_2$ capture, sequestration and transformation, the system comprising:

a cell for separating a liquid or vapor carrier medium, the cell having a first electrode generating oxygen, and a second electrode generating hydrocarbons, oxides of carbon or hydrogen from $CO_2$ in the carrier medium;

an electrical power supply to the first and second electrodes, wherein an electrolytic process occurs whereby oxygen, hydrogen, oxides of carbon or hydrocarbon precursors are produced;

wherein the first and second electrodes include a plurality of geometrical constructs to increase an active surface area of a catalytic surface of the first and electrodes to increase an efficiency of an electrolytic process;

wherein the first and second electrodes are through via constructs;

wherein each geometrical construct of the plurality of geometrical constructs provides electrolytic and capillary control.

13. The catalytic system according to claim 12 wherein the second electrode is a three dimensional electrode configured for converting carbonic acid to simple hydrocarbons.

14. The catalytic system according to claim 12 wherein the system is configured to utilize a Fischer-Tropsch (FT) process for converting $CO_2$ hydrocarbons into more complex chemicals or hydrocarbons.

15. The catalytic system according to claim 12 wherein the system is configured for use in biological filtration of blood, cells, tissue and organisms.

16. The catalytic system according to claim 12 wherein the through via constructs is stacked to support transformation and sorting for reaction cycles.

17. The catalytic system according to claim 12 wherein the system is configured for utilizing carbonated rocks to generate $CO_2$ for transformation into fuel and $H_2$ for fuel cells and batteries.

18. The catalytic system according to claim 12 wherein the geometric constructs are configured to be utilized as a membrane for a rechargeable battery or fuel cell.

19. The catalytic system according to claim 18 wherein the catalytic features form a catalytic membrane and electrolyte layer.

20. The catalytic system according to claim 18 wherein the catalytic features includes a surface or subsurface structure.

21. The catalytic system according to claim 20 wherein the surface or subsurface structure includes a pillar, routing, trench or via.

22. The catalytic system according to claim 18 wherein the catalytic system is powered by in-situ solid state structures.

23. The catalytic system according to claim 18 wherein the catalytic system generates power in series or parallel on a single layer.

24. The catalytic system according to claim 18 further comprising an electrical routing having a trench and a catalytically active area.

25. The catalytic system according to claim 12 wherein the second electrode is a three dimensional electrode separating reactants from starting solutions.

26. The catalytic system according to claim 15 wherein the system is configured to use metals and other materials the biological filtration.

27. The catalytic system according to claim 12 wherein the through via of the second electrode is a three dimensional electrode configured for use in an internal combustion engine for reverting NOx, SOx or COx into fuels, oxidizer or inert materials.

28. The catalytic system according to claim 12 wherein the second electrode supports separating gases in a cell into oxygen and fuel gases for an underwater breathing or propulsion system.

* * * * *